(12) United States Patent
Miyamoto et al.

(10) Patent No.: US 7,864,984 B2
(45) Date of Patent: Jan. 4, 2011

(54) LINE POSITION CALCULATING METHOD, CORRECTION VALUE OBTAINING METHOD, AND STORAGE MEDIUM HAVING PROGRAM STORED THEREON

(75) Inventors: Toru Miyamoto, Shiojiri (JP); Tatsuya Nakano, Hata-machi (JP); Masahiko Yoshida, Shiojiri (JP); Bunji Ishimoto, Matsumoto (JP); Hirokazu Nunokawa, Matsumoto (JP); Yoichi Kakehashi, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 588 days.

(21) Appl. No.: 11/840,061

(22) Filed: Aug. 16, 2007

(65) Prior Publication Data

US 2008/0253607 A1    Oct. 16, 2008

(30) Foreign Application Priority Data

Aug. 18, 2006    (JP) .............................. 2006-223437

(51) Int. Cl.
*G06K 9/00* (2006.01)

(52) U.S. Cl. ....................................... 382/112; 358/1.9

(58) Field of Classification Search ................. 382/100, 382/112, 273, 274; 358/2.1, 2.99, 3.01, 3.06, 358/1.9
See application file for complete search history.

(56) References Cited

U.S. PATENT DOCUMENTS

| 5,185,674 A | * | 2/1993 | Tai .............................. 358/3.07 |
| 6,166,809 A | * | 12/2000 | Pettersen et al. ............. 356/612 |
| 7,006,705 B2 | | 2/2006 | Takayama et al. |
| 7,245,784 B2 | | 7/2007 | Takayama et al. |
| 7,391,928 B2 | | 6/2008 | Takayama et al. |
| 2001/0026370 A1 | * | 10/2001 | Ogushi et al. ................ 358/1.1 |

FOREIGN PATENT DOCUMENTS

| JP | 5-96796 A | 4/1993 |
| JP | 07-089063 A | 4/1995 |
| JP | 2001-325598 A | 11/2001 |
| JP | 2002-077566 A | 3/2002 |
| JP | 2002-279414 A | 9/2002 |

* cited by examiner

*Primary Examiner*—Brian Q Le
(74) *Attorney, Agent, or Firm*—Sughrue Mion, PLLC

(57) ABSTRACT

A line position calculating method is a method for calculating a position, in a second direction, of a line along a first direction in an image, based on image data of the image constituted by a plurality of pixels arranged in a matrix form in the first direction and in the second direction, the method obtains pixel data of each of a plurality of pixels arranged in the first direction, calculates an extent of unevenness of each tone value indicating the pixel data of each of the plurality of pixels arranged in the first direction, sets a threshold value according to the extent of unevenness, sets a range based on the threshold value, detects a defective pixel in which the tone value indicating the pixel data is out of the range, calculates a representative value indicating a tone value of a pixel row, based on the pixel data of the pixels other than the defective pixel of the plurality of pixels constituting the pixel row, and calculates a position, in the second direction, of the line, based on the representative value of each pixel row.

8 Claims, 25 Drawing Sheets

(LINE INTERVAL: 36 DPI)

| CENTROID POSITION OF LINES IN STANDARD PATTERN | CENTROID POSITION OF LINES IN MEASUREMENT PATTERN |
|---|---|
| 150.517188 | |
| 309.61325 | |
| 469.430413 | 373.7686667 |
| 629.784845 | |
| 789.430540 | |
| 948.516717 | |
| 1108.78578 | |
| 1268.46733 | |
| 1427.61466 | |
| 1588.40063 | |
| 1748.53450 | |
| 1907.85035 | |
| 2068.77973 | |
| 2229.55093 | |
| 2389.35303 | |
| 2549.73869 | |
| 2710.57874 | |
| 2869.85372 | |
| 3030.30513 | |
| 3190.58349 | 3248.683.34 |
| 3349.64221 | |
| 3508.76310 | |

| CORRECTION VALUE | BORDER POSITION INFORMATION |
|---|---|
| Ca(1) | LOGIC POSITION CORRESPONDING TO L2 |
| Ca(2) | LOGIC POSITION CORRESPONDING TO L3 |
| Ca(3) | LOGIC POSITION CORRESPONDING TO L4 |
| ⋮ | ⋮ |
| Ca(19) | LOGIC POSITION CORRESPONDING TO L20 |
| Cb | — |

POSITION OF PIXEL INDICATING DIRT IMAGE

POSITION OF PIXEL INDICATING IMAGE OF MISSING DOT

LINE POSITION CALCULATING METHOD, CORRECTION VALUE OBTAINING METHOD, AND STORAGE MEDIUM HAVING PROGRAM STORED THEREON

CROSS-REFERENCE TO RELATED APPLICATION

The present application claims priority upon Japanese Patent Application No. 2006-223437 filed on Aug. 18, 2006, which is herein incorporated by reference.

BACKGROUND

1. Technical Field

The present invention relates to line position calculating methods, correction value obtaining methods, and storage media having a program stored thereon.

2. Related Art

Inkjet printers are known as recording apparatuses in which a medium (such as paper or cloth for example) is transported in a transport direction and recording is carried out on the medium by a head. In such a recording apparatus, when a transport error occurs while transporting the medium, the head cannot record on a correct position on the medium. In particular, with inkjet printers, when ink droplets do not land in the correct position on the medium, there is a risk that white streaks or black streaks will occur in the printed image and image quality deteriorates.

Accordingly, methods are proposed for correcting transport amounts of the medium. For example, in JP-A-5-96796 it is proposed that a test pattern is printed and the test pattern is read, and correction values are calculated based on a reading result such that when an image is to be recorded, the transport amounts are corrected based on the calculated values.

JP-A-5-96796 gives no description concerning what kind of processing is performed on the image data after the test pattern has been read. However, when dirt has adhered to the test pattern or there is a missing dot or the like, defective pixels are produced in the image data and as a result accurate correction values may not be able to be calculated.

SUMMARY

An advantage of the present invention is to accurately detect defective pixels in the case where there are defective pixels due to such factors as adherence of dirt or missing dots.

A main aspect of the present invention for achieving this advantage includes a method for calculating a position, in a second direction, of a line along a first direction in an image, based on image data of the image constituted by a plurality of pixels arranged in a matrix form in the first direction and in the second direction, the method comprising:

obtaining pixel data of each of a plurality of pixels arranged in the first direction;

calculating an extent of unevenness of each tone value indicating the pixel data of each of the plurality of pixels arranged in the first direction;

setting a threshold value according to the extent of unevenness;

setting a range based on the threshold value;

detecting a defective pixel in which the tone value indicating the pixel data is out of the range;

calculating a representative value indicating a tone value of a pixel row, based on the pixel data of the pixels other than the defective pixel of the plurality of pixels constituting the pixel row; and calculating a position, in the second direction, of the line, based on the representative value of each pixel row.

Other features of the invention will become clear through the accompanying drawings and the following description.

BRIEF DESCRIPTION OF THE DRAWINGS

FIG. 32A is an explanatory diagram of the normal range in a case where there is no defective pixel in a pixel row of a white background area. FIG. 32B is an explanatory diagram of the normal range in a case where there is no defective pixel in the pixel row of an area in which a line is formed. FIG. 32C is an explanatory diagram of the normal range in a case where there is a defective pixel in a pixel row. FIG. 32D is an explanatory diagram of the normal range in a case where there is a multitude of defective pixels in a pixel row.

DESCRIPTION OF EMBODIMENTS

Figure 1:
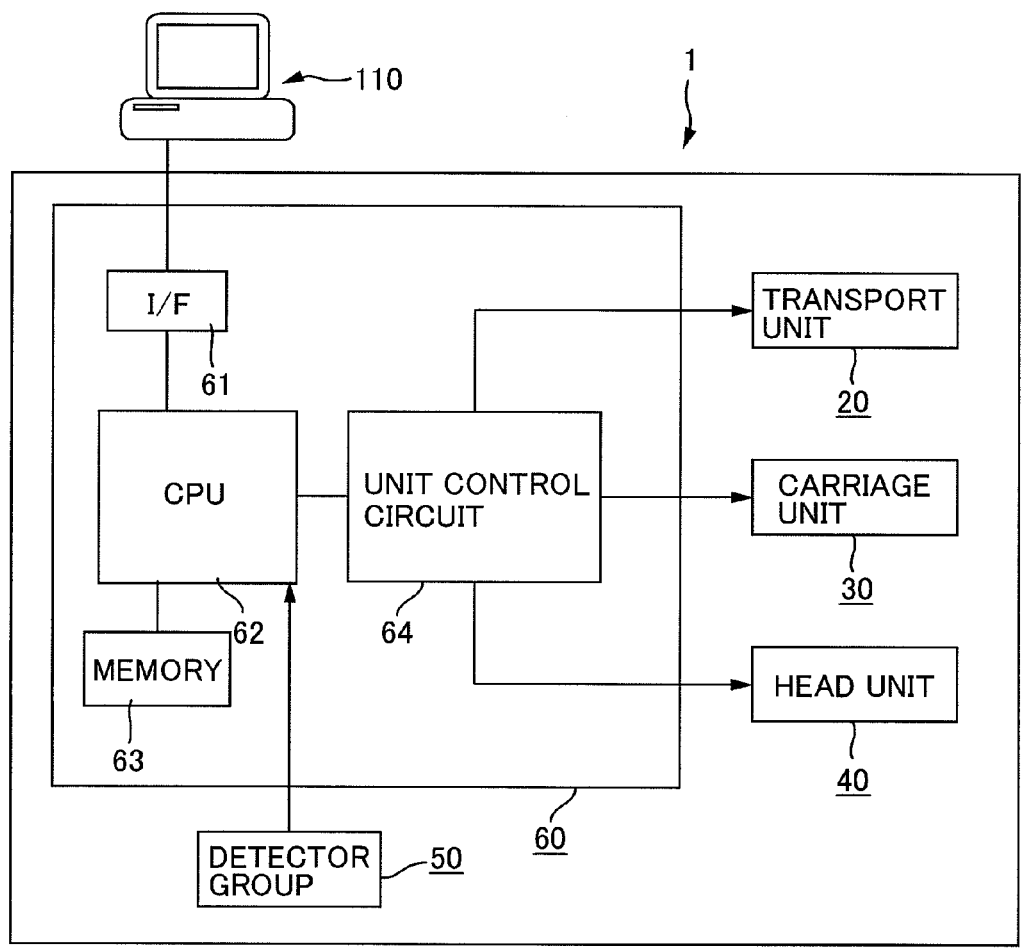
FIG. 1 is a block diagram of an overall configuration of a printer 1.

At least the following matters will be made clear by the explanation in the present specification and the description of the accompanying drawings.

There is realized a method for calculating a position, in a second direction, of a line along a first direction in an image, based on image data of the image constituted by a plurality of pixels arranged in a matrix form in the first direction and in the second direction, the method characterized by:
obtaining pixel data of each of a plurality of pixels arranged in the first direction;
calculating an extent of unevenness of each tone value indicating the pixel data of each of the plurality of pixels arranged in the first direction;
setting a threshold value according to the extent of unevenness;
setting a range based on the threshold value;
detecting a defective pixel in which the tone value indicating the pixel data is out of the range;
calculating a representative value indicating a tone value of a pixel row, based on the pixel data of the pixels other than the defective pixel of the plurality of pixels constituting the pixel row; and
calculating a position, in the second direction, of the line, based on the representative value of each pixel row.

With this line position calculating method, defective pixels can be detected accurately.

Furthermore, it is preferable that the extent of unevenness is a standard deviation, and when setting the range, the range is set based on the each tone value indicating the pixel data of each of the plurality of pixels arranged in the first direction and the standard deviation. In this way, an appropriate range can be set. Furthermore, it is preferable that when setting the threshold value, the threshold value is set based on a value obtained by multiplying the standard deviation by a predetermined coefficient. In this way, a threshold value according to a standard deviation is set. Furthermore, it is preferable that the coefficient is set so that when a value of the standard deviation is large the coefficient is small. In this way, multiple defective pixels can be detected when there are multiple defective pixels.

Furthermore, it is preferable that an average value of the pixel data of the pixels other than the defective pixel, of the plurality of pixels constituting the pixel row, is calculated as the representative value, and a position, in the second direction, of the line is calculated based on the average value. In this way, a position of a line can be accurately calculated.

Furthermore, it is preferable that after obtaining the pixel data of each of the plurality of pixels arranged in the first direction, an approximate line is calculated based on each tone value indicating the pixel data of each of the plurality of pixels arranged in the first direction, and each tone value is corrected based on the approximate line, and when detecting the defective pixel, the defective pixel is detected based on each tone value that has been corrected. In this way, defective pixels can be accurately specified.

Furthermore, a correction value obtaining method includes:
printing a measurement pattern including a plurality of lines on a test sheet by causing a printing apparatus to repetitively carry out alternately a transport operation of transporting a test sheet and a forming operation of forming the lines along a predetermined direction;
obtaining image data of an image constituted by a plurality of pixels arranged in a matrix form in a first direction and a second direction, by reading with a scanner the measurement pattern that has been printed on the test sheet;
calculating a position, in the second direction, of a line along the first direction in the image, based on the image data; and
obtaining a correction value for the transport operation based on the position,
characterized in that
pixel data of each of the plurality of pixels arranged in the first direction is obtained,
an extent of unevenness of tone values indicating the pixel data of each of the plurality of pixels arranged in the first direction is calculated,
a threshold value according to the extent of unevenness is set,
a range based on the threshold value is set,
a defective pixel, in which the tone value indicating the pixel data is out of the range, is detected,
a representative value indicating a tone value of a pixel row is calculated, based on pixel data of pixels other than the defective pixel of the plurality of pixels constituting the pixel row, and
a position, in the second direction, of the line is calculated, based on the representative value of each pixel row.

With such a correction value obtaining method, accurate correction values can be calculated.

Further, a program includes:
code for causing a printing apparatus to print a measurement pattern including a plurality of lines on a test sheet by causing the printing apparatus to repetitively carry out alternately a transport operation of transporting the test sheet and a forming operation of forming the lines along a predetermined direction;
code for causing a computer to output an image data of an image constituted by a plurality of pixels arranged in a matrix form in a first direction and a second direction, by causing a scanner to read the measurement pattern that has been printed on the test sheet;

code for making the computer calculate a position, in the second direction, of a line along the first direction in the image, based on the image data; and code for making the computer obtain a correction value for the transport operation based on the position, characterized in that the program causes the computer to obtain pixel data of each of the plurality of pixels arranged in the first direction, to calculate an extent of unevenness of each tone value indicating the pixel data of each of the plurality of pixels arranged in the first direction, to set a threshold value according to the extent of unevenness, to set a range based on the threshold value, to detect a defective pixel in which the tone value indicating the pixel data is out of the range, to calculate a representative value indicating a tone value of a pixel row, based on the pixel data of the pixels other than the defective pixel of each of the plurality of pixels constituting the pixel row, and to calculate a position, in the second direction, of the line, based on the representative value of each pixel row.

With such a program, a computer can be caused to detect defective pixels accurately.

Configuration of the Printer

Regarding the Configuration of the Inkjet Printer

Figure 2A:
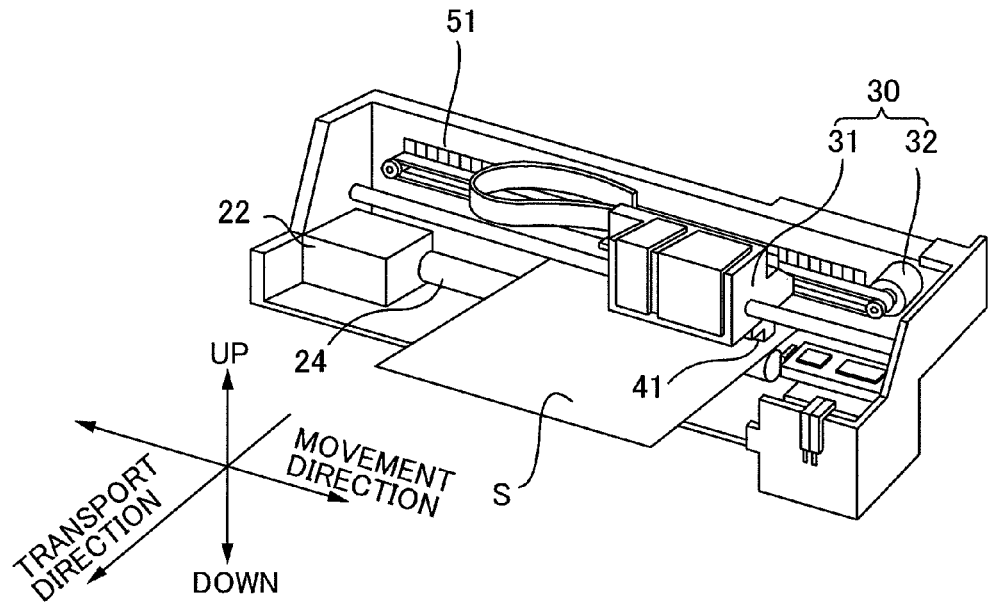
FIG. 2A is a schematic view of the overall configuration of the printer 1.
Figure 2B:
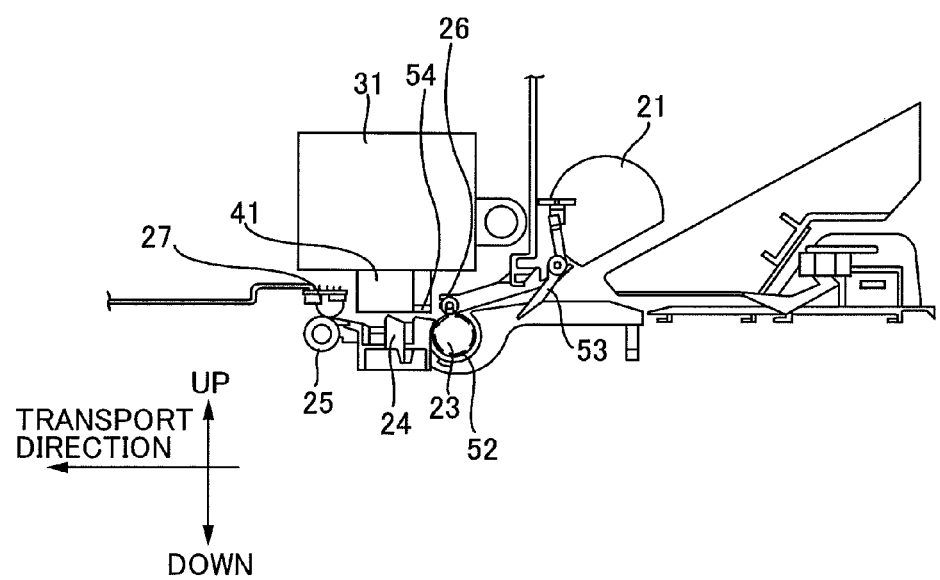
FIG. 2B is a cross sectional view of the overall configuration of the printer 1.

FIG. 1 is a block diagram of an overall configuration of a printer 1. FIG. 2A is a schematic diagram showing the overall configuration of the printer 1. Furthermore, FIG. 2B is a cross sectional view of the overall configuration of the printer 1. The basic configuration of the printer is described below.

The printer 1 has a transport unit 20, a carriage unit 30, a head unit 40, a detector group 50, and a controller 60. The printer 1 receives print data from a computer 110, which is an external device, and controls the various units (the transport unit 20, the carriage unit 30, and the head unit 40) through the controller 60. The controller 60 controls these units based on the print data received from the computer 110 to print an image on the paper. The detector group 50 monitors the conditions within the printer 1, and outputs the detection results to the controller 60. The controller 60 controls these units based on the detection results received from the detector group 50.

The transport unit 20 is for transporting a medium (for example, such as paper S) in a predetermined direction (hereinafter, referred to as "transport direction"). The transport unit 20 has a paper feed roller 21, a transport motor 22 (also referred to as PF motor), a transport roller 23, a platen 24, and a paper discharge roller 25. The paper feed roller 21 is a roller for feeding paper that has been inserted into a paper insert opening into the printer. The transport roller 23 is a roller for transporting a paper S that has been supplied by the paper feed roller 21 up to a printable region, and is driven by the transport motor 22. The platen 24 supports the paper S being printed. The paper discharge roller 25 is a roller for discharging the paper S outside the printer, and is provided on the downstream side in the transport direction with respect to the printable area. The paper discharge roller 25 is rotated in synchronization with the transport roller 23.

It should be noted that when the transport roller 23 transports the paper S, the paper S is sandwiched between the transport roller 23 and a driven roller 26. In this way, the posture of the paper S is kept stable. On the other hand, when the paper discharge roller 25 transports the paper S, the paper S is sandwiched between the paper discharge roller 25 and a driven roller 27. The discharge roller 25 is provided on a downstream side from the printable region in the transport direction and therefore the driven roller 27 is configured so that its contact surface with the paper S is small (see FIG. 4). For this reason, when the lower end of the paper S passes through the transport roller 23 and the paper S is transported by the paper discharge roller 25 only, the posture of the paper S tends to become unstable, which also tends to make the transport characteristics fluctuate.

The carriage unit 30 is for making the head move (also referred to as "scan") in a predetermined direction (hereinafter, referred to as the "movement direction"). The carriage unit 30 has a carriage 31 and a carriage motor 32 (also referred to as "CR motor"). The carriage 31 can be moved back and forth in the moving direction, and is driven by the carriage motor 32. The carriage 31 detachably holds ink cartridges that contain ink.

The head unit 40 is for ejecting ink onto paper. The head unit 40 has a head 41 including a plurality of nozzles. The head 41 is provided in the carriage 31 so that when the carriage 31 moves in the movement direction, the head 41 also moves in the movement direction. Dot lines (raster lines) are formed on the paper in the movement direction due to the head 41 intermittently ejecting ink while moving in the movement direction.

The detector group 50 includes a linear encoder 51, a rotary encoder 52, a paper detection sensor 53, and an optical sensor 54, and the like. The linear encoder 51 is for detecting the position of the carriage 31 in the movement direction. The rotary encoder 52 is for detecting the amount of rotation of the transport roller 23. The paper detection sensor 53 detects the position of the front end of the paper that is being fed. The optical sensor 54 detects whether or not the paper is present, through its light-emitting section and a light-receiving section provided to the carriage 31. The optical sensor 54 can also detect the width of the paper by detecting the position of the end portions of the paper while being moved by the carriage 31. Depending on the circumstances, the optical sensor 54 can also detect the front end of the paper (the end portion at the transport direction downstream side; also referred to as the upper end) and the rear end of the paper (the end portion on the transport direction upstream side; also referred to as the lower end).

The controller 60 is a control unit (controller) for carrying out control of the printer. The controller 60 has an interface section 61, a CPU 62, a memory 63, and a unit control circuit 64. The interface section 61 exchanges data between the computer 110, which is an external device, and the printer 1. The CPU 62 is an arithmetic processing device for carrying out overall control of the printer. The memory 63 is for ensuring a working area and a storage area for the programs for the CPU 62, for instance, and includes storage devices such as a RAM or an EEPROM. The CPU 62 controls the various units via the unit control circuit 64 in accordance with programs stored in the memory 63.

Regarding the Nozzles

Figure 3:
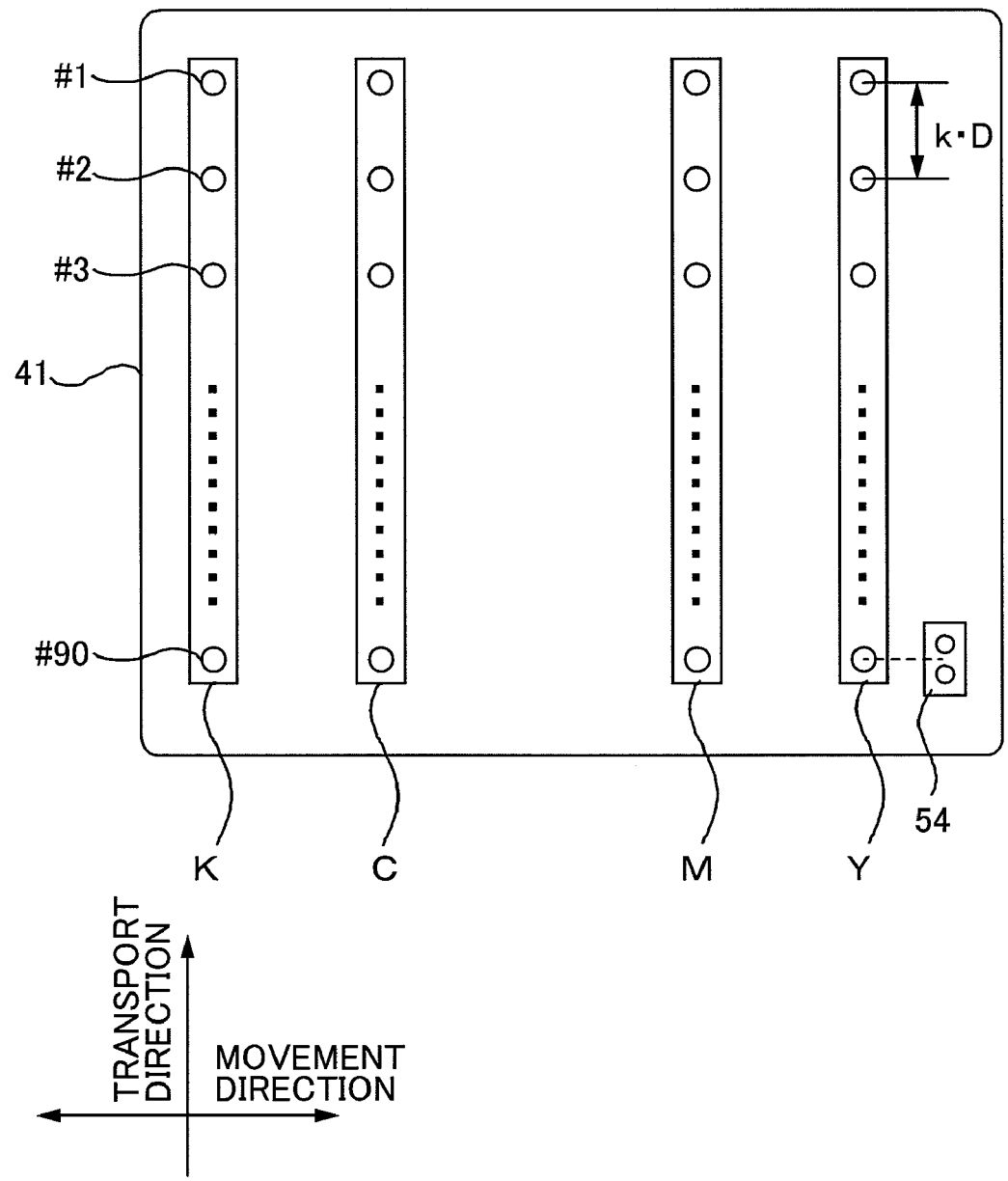
FIG. 3 is an explanatory diagram showing an arrangement of the nozzles.

FIG. 3 is an explanatory diagram showing the arrangement of the nozzles in the lower face of the head 41. A black ink nozzle group K, a cyan ink nozzle group C, a magenta ink nozzle group M, and a yellow ink nozzle group Y are formed in the lower face of the head 41. Each nozzle group is provided with 90 nozzles, which are ejection openings for ejecting ink of the respective colors.

The plurality of nozzles of each of the nozzle groups are arranged in rows at a constant spacing (nozzle pitch: k·D) in the transport direction. Here, D is the minimum dot pitch in the transport direction (that is, the spacing between dots formed on the paper S at maximum resolution). Also, k is an integer of 1 or more. For example, if the nozzle pitch is 90 dpi (1/90 inch), and the dot pitch in the transport direction is 720 dpi (1/720 inch), then k=8.

Each nozzle of each of the nozzle groups is assigned a number (#1 to #90) that becomes smaller as the nozzle is arranged more downstream. That is, the nozzle #1 is positioned more downstream in the transport direction than the nozzle #90. Also, the optical sensor 54 described above is provided substantially to the same position as the nozzle #90, which is on the most upstream side regarding its position in the paper transport direction.

Each nozzle is provided with an ink chamber (not shown) and a piezo element. Driving the piezo element causes the ink chamber to expand and contract, thereby ejecting an ink droplet from the nozzle.

Transport Error

Regarding Transport of the Paper

Figure 4:
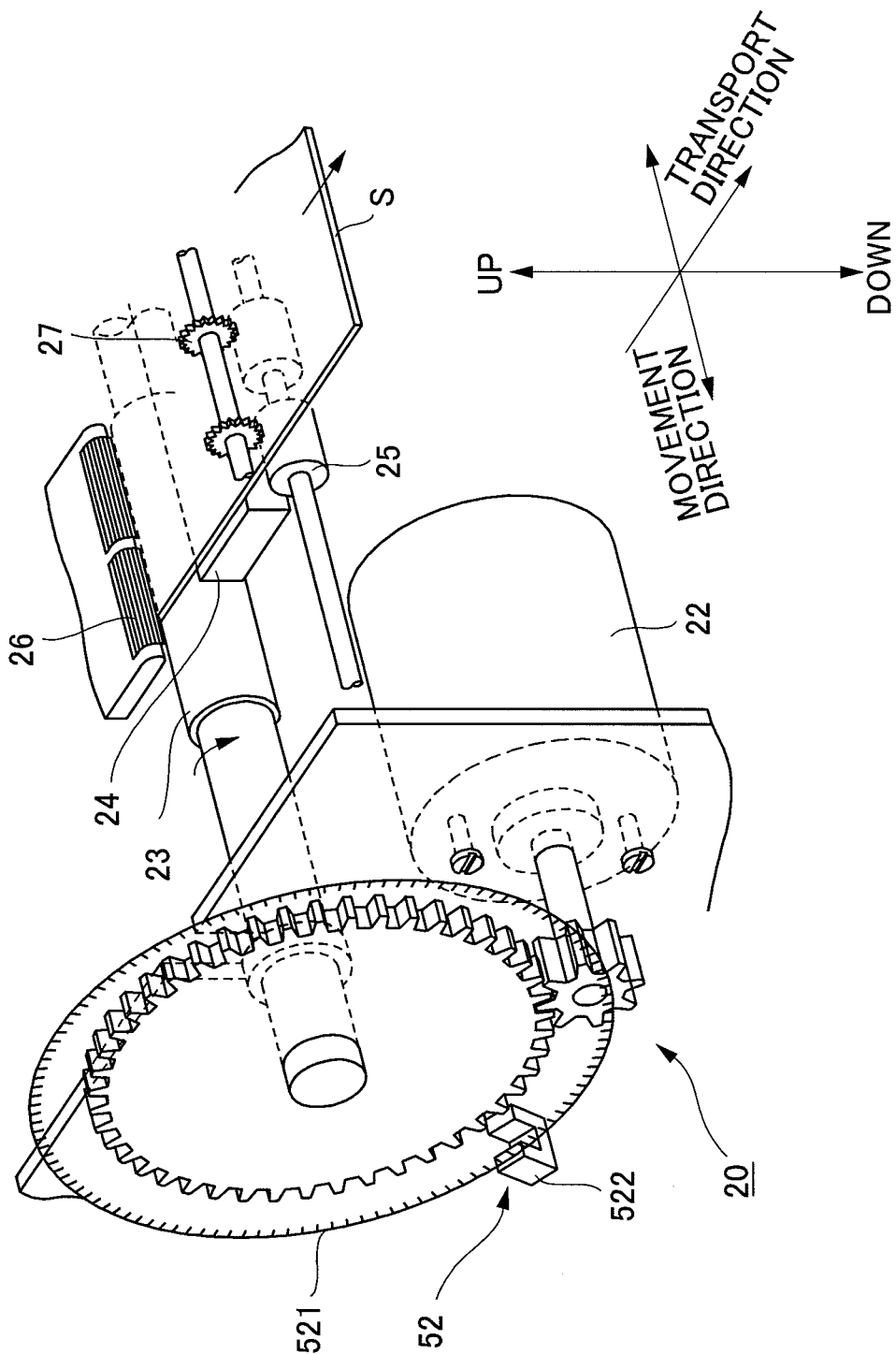
FIG. 4 is an explanatory diagram of a configuration of the transport unit 20.

FIG. 4 is an explanatory diagram of a configuration of the transport unit 20.

The transport unit 20 drives the transport motor 22 by predetermined drive amounts in accordance with a transport command from the controller 60. The transport motor 22 generates a drive force in the rotation direction that corresponds to the drive amount that has been ordered. The transport motor 22 then rotates the transport roller 23 using this drive force. That is, when the transport motor 22 generates a predetermined drive amount, the transport roller 23 is rotated by a predetermined rotation amount. When the transport roller 23 rotates by the predetermined rotation amount, the paper is transported by a predetermined transport amount.

The amount by which the paper is transported is determined according to the rotation amount of the transport roller 23. In the present embodiment, when the transport roller 23 performs one rotation, the paper is transported by one inch (that is, the circumference of the transport roller 23 is one inch). Thus, when the transport roller 23 rotates one quarter, the paper is transported by ¼ inch.

Consequently, if the rotation amount of the transport roller 23 can be detected, it is also possible to detect the transport amount of the paper. Accordingly, the rotary encoder 52 is provided in order to detect the rotation amount of the transport roller 23.

The rotary encoder 52 has a scale 521 and a detection section 522. The scale 521 has numerous slits provided at a predetermined spacing. The scale 521 is provided on the transport roller 23. That is, the scale 521 rotates together with the transport roller 23 when the transport roller 23 is rotated. Then, when the transport roller 23 rotates, each slit on the scale 521 successively passes through the detection section 522. The detection section 522 is provided in opposition to the scale 521, and is fastened on the main printer unit side. The rotary encoder 52 outputs a pulse signal each time a slit provided in the scale 521 passes through the detection section 522. Since the slits provided in the scale 521 successively pass through the detection section 522 according to the rotation amount of the transport roller 23, the rotation amount of the transport roller 23 is detected based on the output of the rotary encoder 52.

Then, when the paper is to be transported by a transport amount of one inch for example, the controller 60 drives the transport motor 22 until the rotary encoder 52 detects that the transport roller 23 has performed one rotation. In this manner, the controller 60 drives the transport motor 22 until a transport amount corresponding to a targeted transport amount (target transport amount) is detected by the rotary encoder 52 such that the paper is transported by the target transport amount.

Regarding Transport Error

In this regard, the rotary encoder 52 directly detects the rotation amount of the transport roller 23, and strictly speaking, is not detecting the transport amount of the paper S. For this reason, when the rotation amount of the transport roller 23 and the transport amount of the paper S do not match, the rotary encoder 52 cannot accurately detect the transport amount of the paper S, and a transport error (detection error) occurs. There are two types of transport error, DC component transport error and AC component transport error.

DC component transport error refers to a predetermined amount of transport error produced when the transport roller has performed one rotation. It is conceived that the DC component transport error is caused by the circumference of the transport roller 23 being different in each individual printer due to deviation in production and the like. In other words, the DC component transport error is a transport error that occurs because of the difference between the circumference of the transport roller 23 in design and the actual circumference of the transport roller 23. The DC component transport error is constant regardless of the commencement position when the transport roller 23 performs one rotation. However, due to the effect of paper friction and the like, the actual DC component transport error is a value that varies in response to a total transport amount of the paper (discussed later). In other words, the actual DC component transport error is a value that varies in response to the relative positional relationship between the paper S and the transport roller 23 (or the paper S and the head 41).

The AC component transport error refers to transport error corresponding to a location on a circumferential surface of the transport roller that is used when transporting. The AC component transport error is an amount that varies in response to the location on the circumferential surface of the transport roller that is used when transporting. That is, the AC component transport error is an amount that varies in response to the rotation position of the transport roller when transport commences and the transport amount.

Figure 5:
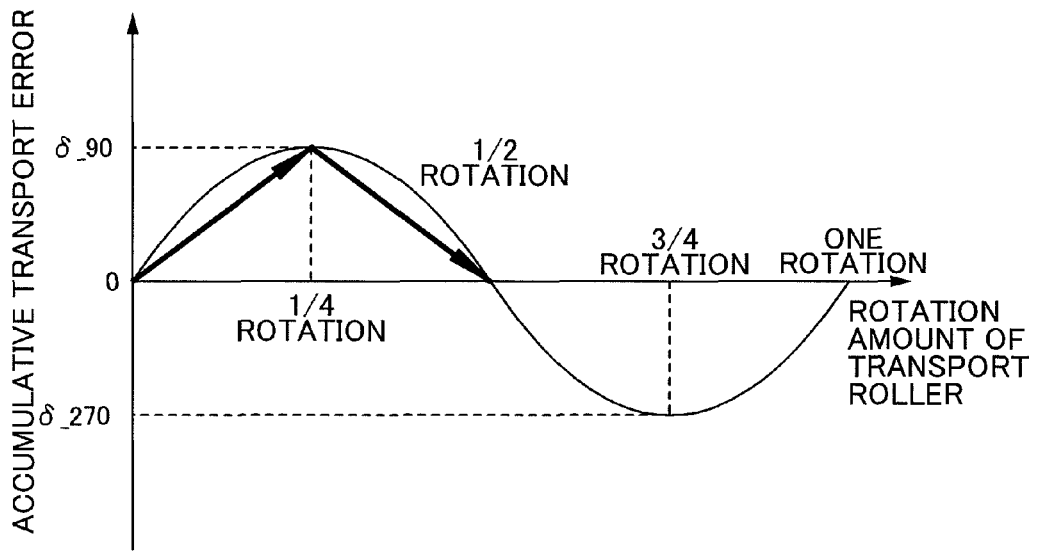
FIG. 5 is a graph for describing AC component transport error.

FIG. 5 is a graph for describing AC component transport error. The horizontal axis indicates the rotation amount of the transport roller 23 from a rotation position which is a reference. The vertical axis indicates transport error. By differentiation of the graph, the transport error that occurs when the transport roller is rotating at that rotation position is deduced. Here, accumulative transport error at the reference position is set to zero and the DC component transport error is also set to zero.

When the transport roller 23 performs a ¼ rotation from the reference position, a transport error of $\delta\_90$ occurs, and the paper is transported by ¼ inch+$\delta\_90$. However, when the transport roller 23 performs a further ¼ rotation, a transport error of $-\delta\_90$ occurs, and the paper is transported by ¼ inch−$\delta\_90$.

The following three causes are conceivable as causes of AC component transport error for example.

First, influence due to the shape of the transport roller is conceivable. For example, when the transport roller is elliptical or egg shaped, the distance to the rotational center varies in response to the location on the circumferential surface of the transport roller. And when the medium is transported at an area where the distance to the rotational center is long, the transport amount with respect to the rotation amount of the transport roller increases. On the other hand, when the medium is transported at an area where the distance to the rotational center is short, the transport amount with respect to the rotation amount of the transport roller decreases.

Secondly, the eccentricity of the rotational axis of the transport roller is conceivable. In this case too, the length to the rotational center varies in response to the location on the circumferential surface of the transport roller. For this reason, even if the rotation amount of the transport roller is the same, the transport amount varies in response to the location on the circumferential surface of the transport roller.

Thirdly, in consistency between the rotational axis of the transport roller and the center of the scale 521 of the rotary encoder 52 is conceivable. In this case, the scale 521 rotates eccentrically. As a result, the rotation amount of the transport roller 23 with respect to the detected pulse signals varies in response to the location of the scale 521 detected by the detection section 522. For example, when the detected location of the scale 521 is far from the rotational axis of the transport roller 23, the rotation amount of the transport roller 23 with respect to the detected pulse signals becomes smaller, and therefore the transport amount becomes smaller. On the other hand, when the detected location of the scale 521 is close to the rotational axis of the transport roller 23, the rotation amount of the transport roller 23 with respect to the detected pulse signals becomes larger, and therefore the transport amount becomes larger.

As a result of these causes, the AC component transport error substantially become a sine curve as shown in FIG. 5.

Transport Error Corrected by the Present Embodiment

Figure 6:
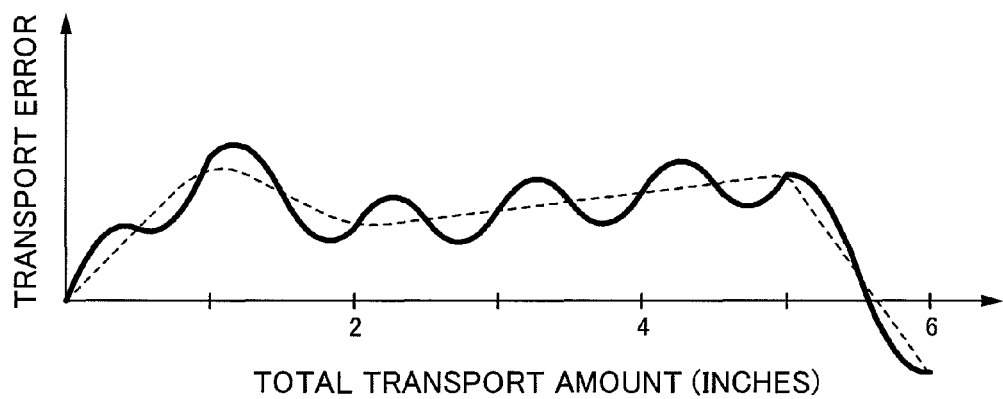
FIG. 6 is a graph (schematic diagram) of transport error that occurs when transporting a paper.

FIG. 6 is a graph (schematic diagram) of transport error that occurs when transporting a paper of a size 101.6 mm×152.4 mm (4×6 inches). The horizontal axis in the graph indicates a total transport amount of the paper. The vertical axis in the graph indicates transport error. The dotted line in FIG. 6 is a graph of the DC component transport error. The AC component transport error can be obtained by subtracting the dotted line values (DC component transport error) in FIG. 6 from the solid line values (total transport error) in FIG. 6. Regardless of the total transport amount of the paper, the AC component transport error is substantially a sine curve. On the other hand, due to the effect of paper friction and the like, the DC component transport error indicated by the dotted line is a value that varies in response to the total transport amount of the paper.

As has been described, AC component transport error varies in response to the location on the circumferential surface of the transport roller 23. For this reason, even when transporting the same sheet of paper, the AC component transport error may vary if rotation positions on the transport roller 23 at the commencement of transport vary, and therefore the total transport error (transport error indicated by a solid line on the graph) may vary. On the contrary, unlike the AC component transport error, DC component transport error has no relation to the location on the circumferential surface of the transport roller, and therefore even if the rotation positions of the transport roller 23 at the commencement of transport vary, the transport error (DC component transport error) which occurs when the transport roller 23 performs one rotation is the same.

Furthermore, when attempting to correct the AC component transport error, it is necessary for the controller 60 to detect the rotation position of the transport roller 23. However, to detect the rotation position of the transport roller 23 it is necessary to further prepare an origin sensor for the rotary encoder 52, which results in increased costs.

Consequently, in the corrections of transport amount shown below according to this embodiment, the DC component transport error is corrected.

On the other hand, the DC component transport error is a value that varies (see the dotted line in FIG. 6) in response to the total transport amount of the paper (in other words, the relative positional relationship between the paper S and the transport roller 23). For this reason, if a further greater number of correction values can be prepared corresponding to transport direction positions, fine corrections of transport error can be performed. Consequently, in this embodiment, correction values for correcting DC component transport error are prepared for each ¼ inch range rather than for each one inch range that corresponds to one rotation of the transport roller 23.

Overall Description

Figure 7:
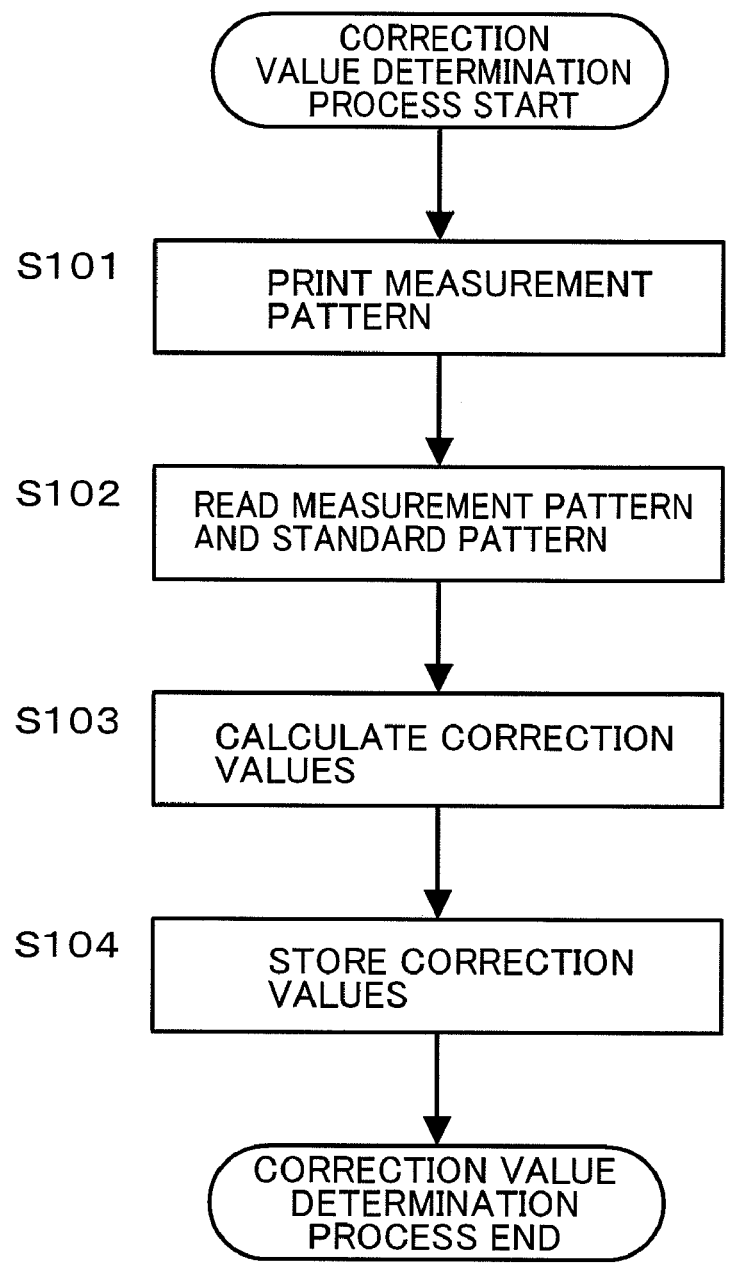
FIG. 7 is a flowchart showing up to determining the correction values for correcting transport amounts.
Figure 8A:
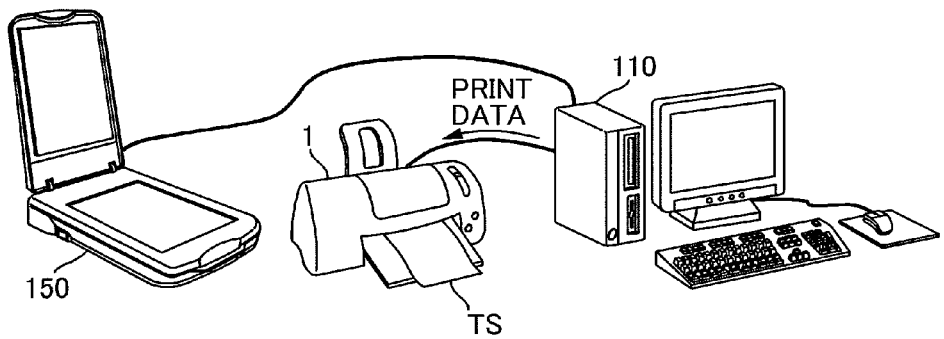
FIGS. 8A to 8C are explanatory diagrams of states before determining correction values.
Figure 8B:
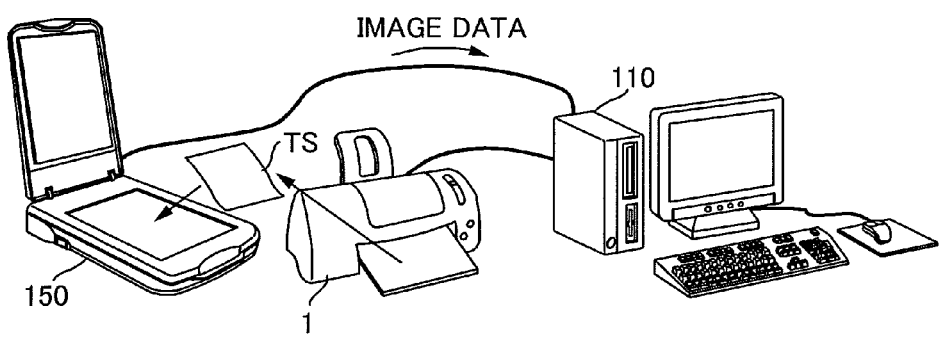
Figure 8C:
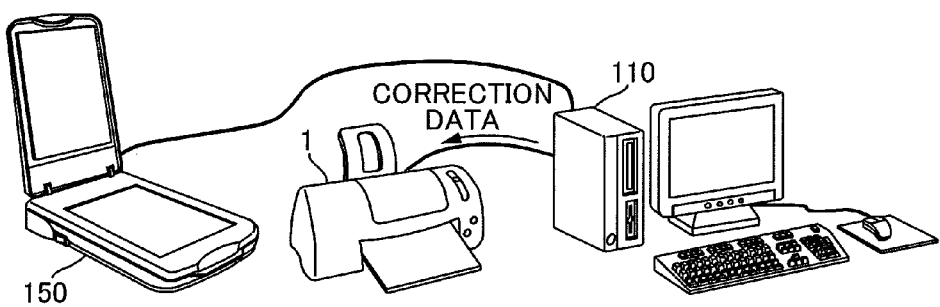

FIG. 7 is a flowchart showing up to determining the correction values for correcting transport amounts. FIGS. 8A to 8C are explanatory diagrams of conditions up to determining correction values. These processes are performed in an inspection process at a printer manufacturing factory. Prior to this process, an inspector connects a printer 1 that is assembled to a computer 110 in the factory. The computer 110 in the factory is connected to a scanner 150 as well and is preinstalled with a printer driver, a scanner driver, and a program for obtaining correction values.

First, the printer driver sends print data to the printer 1 and the printer 1 prints a measurement pattern on a test sheet TS (S101, FIG. 8A). Next, the inspector sets the test sheet TS in the scanner 150 and the scanner driver causes the measurement pattern to be read by the scanner 150 so as to obtain that image data (S102, FIG. 8B). It should be noted that a standard sheet is set in the scanner 150 along with the test sheet TS, and a standard pattern drawn on the standard sheet is also read together.

Then, the program for obtaining correction values analyzes the image data that has been obtained and calculates correction values (S103). Then the program for obtaining correction values sends the correction data to the printer 1 and the correction values are stored in a memory 63 of the printer 1 (FIG. 8C). The correction values stored in the printer reflect the transport characteristics of each individual printer.

It should be noted that the printer, which has stored correction values, is packaged and delivered to a user. When the user is to print an image with the printer, the printer transports the paper based on the correction values, and prints the image onto the paper.

Printing of a Measurement Pattern (S101)

First, description is given concerning the printing of the measurement pattern. As with ordinary printing, the printer 1 prints the measurement pattern on a paper by alternately repeating a dot forming process in which dots are formed by ejecting ink from moving nozzles and a transport operation in which the paper is transported in the transport direction. It should be noted that in the description hereinafter, the dot forming process is referred to as a "pass" and an n-th dot forming process is referred to as "pass n".

Figure 9:
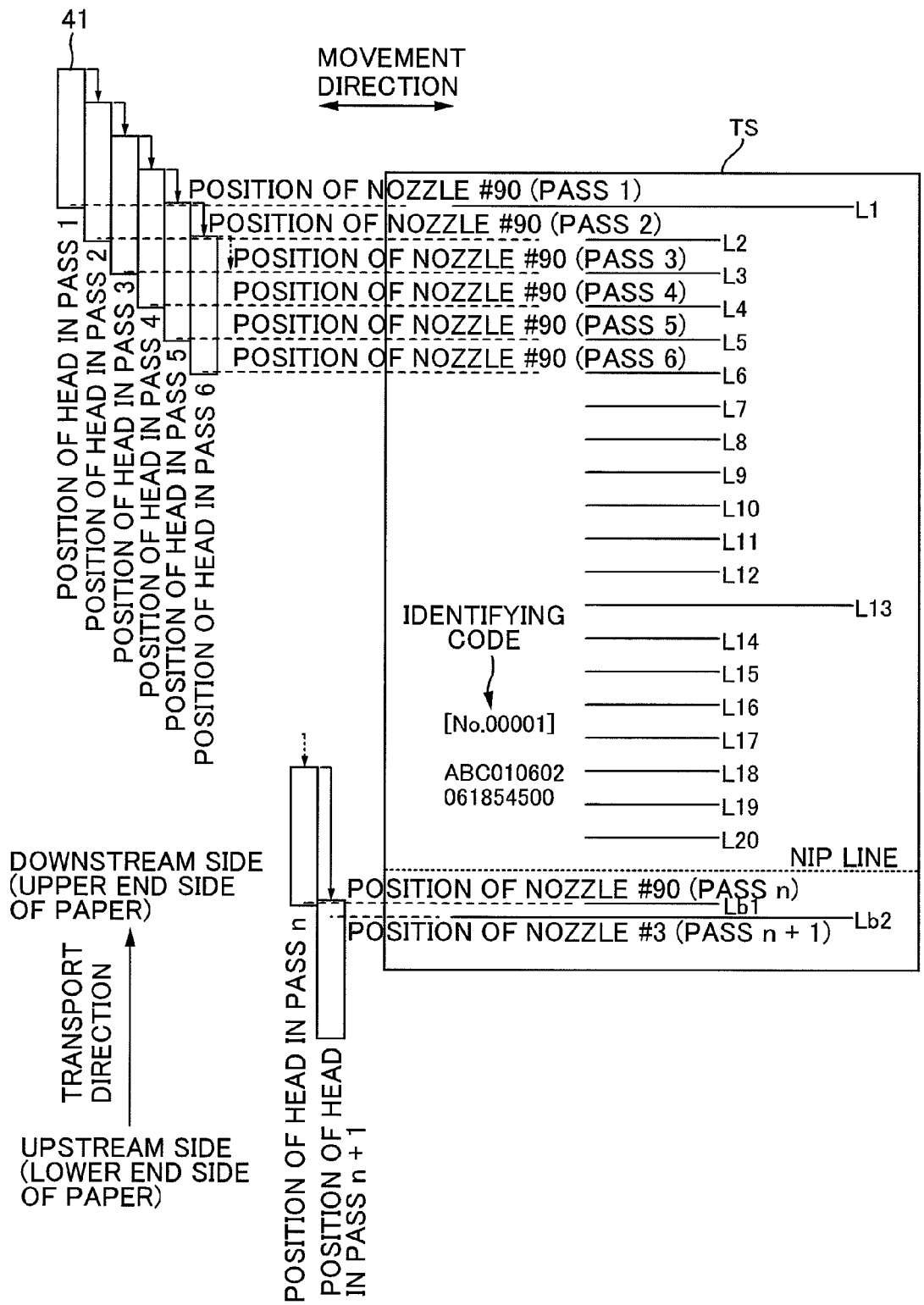
FIG. 9 is an explanatory diagram illustrating a state of printing a measurement pattern.

FIG. 9 is an explanatory diagram illustrating a state of printing a measurement pattern. The size of a test sheet TS on which the measurement pattern is printed is 101.6 mm×152.4 mm (4×6 inches).

The measurement pattern printed on the test sheet TS is shown on the right side of FIG. 9. The rectangles on the left side of FIG. 9 indicate the position (the relative position with respect to the test sheet TS) of the head 41 at each pass. To facilitate description, the head 41 is illustrated as if moving with respect to the test sheet TS, however, FIG. 9 shows the relative positional relationship of the head and the test sheet TS, and in fact the test sheet TS is being transported intermittently in the transport direction.

When the test sheet TS continues to be transported, the lower end of the test sheet TS passes through the transport roller 23. The position on the test sheet TS in opposition to the most upstream nozzle #90 when the lower end of the test sheet TS passes through the transport roller 23 is shown by a dotted line in FIG. 9 as a "NIP line". That is, in passes where the head 41 is higher than the NIP line in FIG. 9, printing is carried out in a state in which the test sheet TS is sandwiched between the transport roller 23 and the driven roller 26 (also referred to as a "NIP state"). Furthermore, in passes where the head 41 is lower than the NIP line in FIG. 9, printing is carried out in a state in which the test sheet TS is not located between the transport roller 23 and the driven roller 26 (which is a state in which the test sheet TS is transported by only the discharge roller 25 and the driven roller 27 and is also referred to as a "non NIP state").

The measurement pattern is constituted by an identifying code and a plurality of lines.

The identifying code is a symbol for individual identification for identifying each of the individual printers 1 respectively. The identifying code is also read together with the measurement pattern when the measurement pattern is read at S102, and is identified by the computer 110, using character recognition of OCR.

Each of the lines is formed along the movement direction respectively. A plurality of lines are formed on the upper end side from the NIP line. Lines on the upper end side from the NIP line are referred to "Li" in order from the upper end side for each i-th line. Furthermore, two lines are formed on the lower end side from the NIP line. Of the two lines on the lower end side from the NIP line, the upper end side line is referred to as Lb1 and the lower end side line (the lowest line) is referred to as Lb2. Particular lines are formed longer than other lines. For example, line L1, line L13, and line Lb2 are formed longer compared to the other lines. These lines are formed as follows.

First, after the test sheet TS is transported to a predetermined print commencement position, ink droplets are ejected from only nozzle #90 in pass 1 thereby forming the line L1. After pass 1, the controller 60 causes the transport roller 23 to perform a ¼ rotation so that the test sheet TS is transported by approximately ¼ inch. After transport, ink droplets are ejected from only nozzle #90 in pass 2 thereby forming the line L2. Thereafter, the same operation is repeatedly performed and the lines L1 to L20 are formed at intervals of approximately ¼ inch. In this manner, the lines L1 to L20, which are on the upper end side from the NIP line, are formed using the most upstream nozzle #90 of the nozzle #1 to nozzle #90. In this way, the most possible number of lines can be formed on the test sheet TS in the NIP state. It should be noted that although line L1 to line L20 are formed using only nozzle #90, nozzles other than the nozzle #90 are used when printing the identifying code in the pass in which the identifying code is printed.

After the lower end of the test sheet TS has passed through the transport roller 23, ink droplets are ejected from only nozzle #90 in pass n, thereby forming the line Lb1. After pass n, the controller 60 causes the transport roller 23 to perform one rotation so that the test sheet TS is transported by approximately one inch. After transport, ink droplets are ejected from only nozzle #3 in pass n+1, thereby forming the line Lb2. When assuming nozzle #1 is being used, the interval between the line Lb1 and the line Lb2 becomes extremely narrow (approximately 1/90 inch), which would make measuring difficult when the interval between the line Lb1 and the line Lb2 is to be measured subsequently. For this reason, in this embodiment, the interval between the line Lb1 and the line Lb2 is widened by forming the line Lb2 using nozzle #3, which is on the upstream side from the nozzle #1 in the transport direction, thereby facilitating measurement.

Incidentally, when transport of the test sheet TS is carried out ideally, the interval between the lines from line L1 to line L20 should be precisely ¼ inch. However, when there is transport error, the line interval is not ¼ inch. If the test sheet TS is transported by more than an ideal transport amount, then the line interval widens. Conversely, if the test sheet TS is transported by less than an ideal transport amount, then the line interval narrows. That is, the interval between certain two lines reflects the transport error in the transport process between a pass in which one of the lines is formed and a pass in which the other of the lines is formed. For this reason, by measuring the interval between two lines, it becomes possible to measure the transport error in the transport process performed between a pass in which one of the lines is formed and a pass in which the other of the lines is formed.

Similarly, the interval between the line Lb1 and the line Lb2 should be precisely 3/90 inch when transport of the test sheet TS is carried out ideally (or more accurately, when the ejection of ink from the nozzle #90 and nozzle #3 is also the same). However, when there is transport error, the line interval does not become 3/90 inch. For this reason, it is conceivable that the interval between the line Lb1 and the line Lb2 reflects transport error in the transport process in a non NIP state. For this reason, by measuring the interval between the line Lb1 and the line Lb2, it becomes possible to measure the transport error in the transport process in a non NIP state.

Pattern Reading (S102)

Scanner Configuration

First, description is given concerning the configuration of the scanner 150 used in reading the measurement pattern.

Figure 10A:
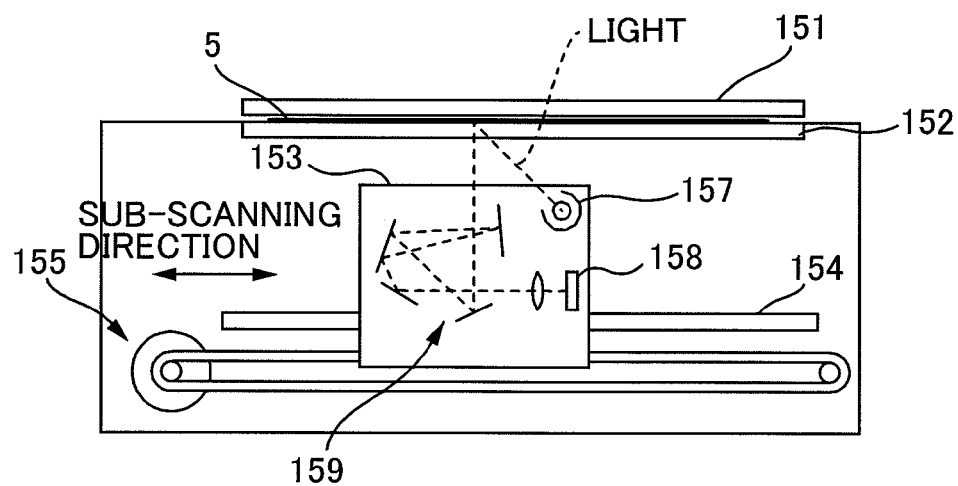
FIG. 10A is a longitudinal sectional view of the scanner 150.
Figure 10B:
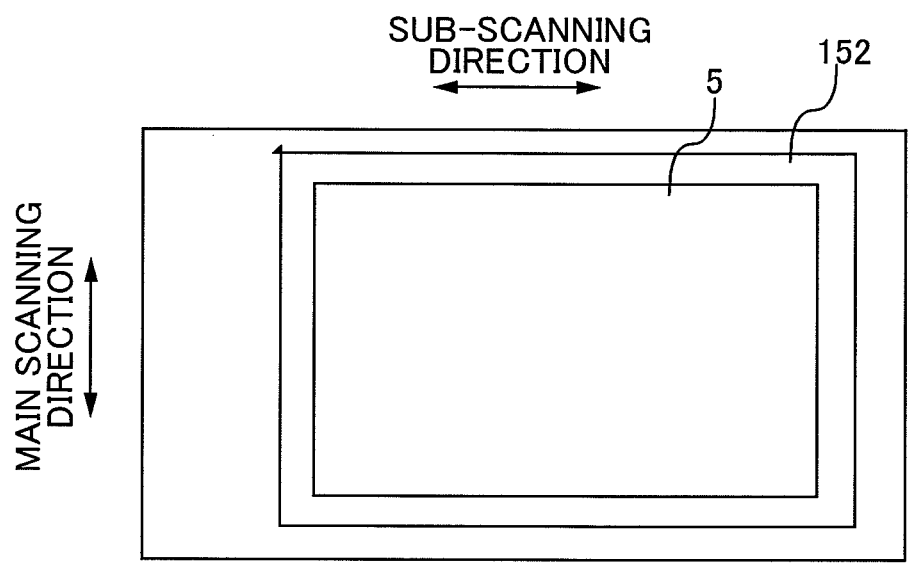
FIG. 10B is a top view of the scanner 150 with an upper cover 151 removed.

FIG. 10A is a vertical sectional view of the scanner 150. FIG. 10B is a plan view of the scanner 150 with an upper cover 151 detached. The scanner 150 is provided with the upper cover 151, a document platen glass 152 on which a document 5 is placed, a reading carriage 153 that faces the document 5 through the document platen glass 152 and that moves in a sub-scanning direction, a guiding member 154 for guiding the reading carriage 153 in the sub-scanning direction, a moving mechanism 155 for moving the reading carriage 153, and a scanner controller (not shown) that controls each section of the scanner 150. The reading carriage 153 is provided with an exposure lamp 157 that shines light on the document 5, a line sensor 158 that detects an image of a line in the main-scanning direction (direction perpendicular to the paper surface in FIG. 10A), and an optical system 159 that lead the reflected light from the document 5 to the line sensor 158. Dashed lines in the reading carriage 153 shown in FIG. 5A show the path of light.

In order to read an image of the document 5, an operator raises the upper cover 151, places the document 5 on the document platen glass 152, and lowers the upper cover 151. The scanner controller moves the reading carriage 153 in the sub-scanning direction with the exposure lamp 157 caused to emit light, and the line sensor 158 reads the image on a surface of the document 5. The scanner controller transmits the read image data to the scanner driver of the computer 110, and thereby, the computer 110 obtains the image data of the document 5.

Positional Accuracy in Reading

As is described later, in this embodiment, the scanner 150 scans the measurement pattern of the test sheet TS and the standard pattern of the standard sheet at a resolution of 720 dpi (main scanning direction)×720 dpi (sub-scanning direction). Thus, in the following description, description is given assuming image reading at a resolution of 720×720 dpi.

Figure 11:
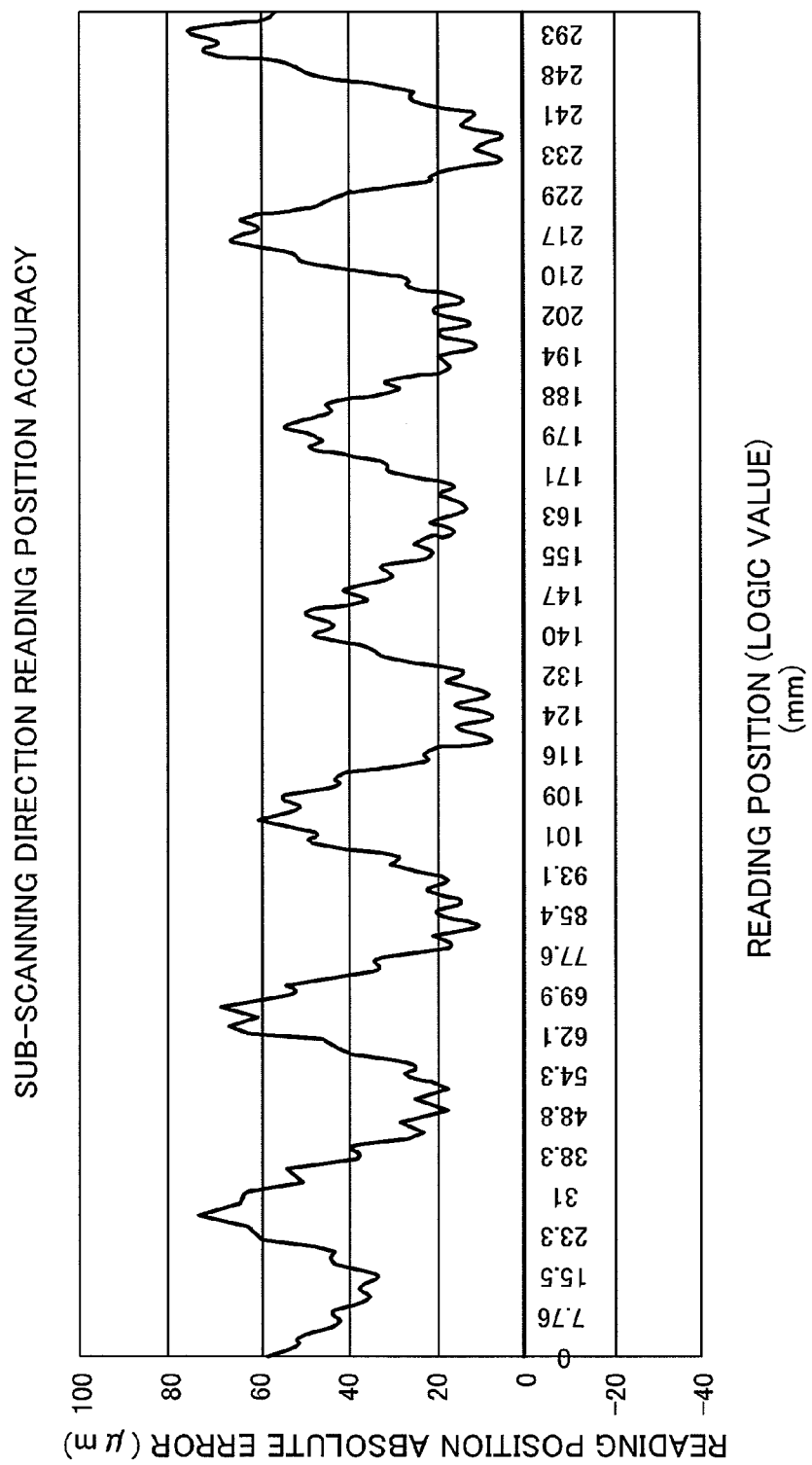
FIG. 11 is a graph of scanner reading position error.

FIG. 11 is a graph of scanner reading position error. The horizontal axis in the graph indicates reading positions (logic values) (that is, the horizontal axis in the graph indicates positions (logic values) of the reading carriage 153). The vertical axis in the graph indicates reading position error (difference between the logic values of reading positions and actual reading positions). For example, when the reading carriage 153 is caused to move 1 inch (=25.4 mm), an error of approximately 60 μm occurs.

Assuming that the logic value of the reading position and the actual reading position match, a pixel that is 720 pixels apart in the sub-scanning direction from a pixel indicating a reference position (a position where the reading position is zero) should be indicated as an image in a position precisely one inch apart from the reference position. However, when reading position error occurs as shown in the graph, the pixel that is 720 pixels apart in the sub-scanning direction from the pixel indicating a reference position is indicated as an image that is a further 60 μm apart from the position that is one inch apart from the reference position.

Furthermore, assuming that there is zero tilt in the graph, the image should be read with a uniform interval each $\frac{1}{720}$ inch. However, when the graph tilt is in a positive position, the image is read with an interval longer than $\frac{1}{720}$ inch. And when the graph tilt is in a negative position, the image is read with an interval shorter than $\frac{1}{720}$ inch.

As a result, even supposing the lines of the measurement pattern are formed with uniform intervals, the line images in the image data will not have uniform intervals in a state in which there is reading position error. In this manner, in a state in which there is reading position error, line positions cannot be accurately measured by simply reading the measurement pattern.

Consequently, in this embodiment, when the test sheet TS is set and the measurement pattern is read by the scanner, a standard sheet is set and a standard pattern is also read.

Reading the Measurement Pattern and the Standard Pattern

Figure 12A:
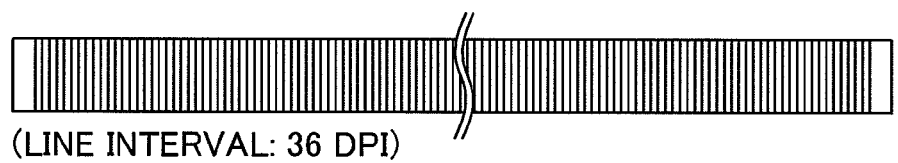
FIG. 12A is an explanatory diagram for a standard sheet SS.

FIG. 12A is an explanatory diagram for a standard sheet SS. FIG. 12 B is an explanatory diagram of a condition in which a test sheet TS and a standard sheet SS are set on the document platen glass 152.

A size of the standard sheet SS is 10 mm×300 mm such that the standard sheet SS is a long narrow shape. A multitude of lines are formed as a standard pattern at intervals of 36 dpi on the standard sheet SS. Since it is used repetitively, the standard sheet SS is constituted by a PET film rather than a paper. Furthermore, the standard pattern is formed with high precision using laser processing.

Figure 12B:
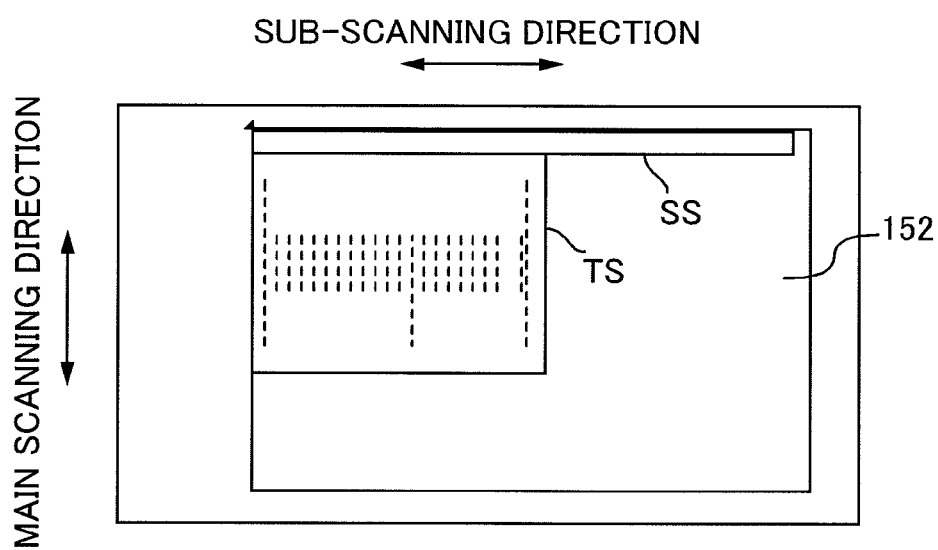
FIG. 12B is an explanatory diagram of a state in which a test sheet TS and a standard sheet SS are set on a document platen glass 152.

The test sheet TS and the standard sheet SS are set in a predetermined position on the document platen glass 152 using a jig not shown in FIG. 12B. The standard sheet SS is set on the document platen glass 152 so that its long sides become parallel to the sub-scanning direction of the scanner 150, that is, so that each line of the standard sheet SS becomes parallel to the main-scanning direction of the scanner 150. The test sheet TS is set beside this standard sheet SS. The test sheet TS is set on the document platen glass 152 so that its long sides become parallel to the sub-scanning direction of the scanner 150, that is, so that each line of the measurement pattern becomes parallel to the main-scanning direction.

In this state with the test sheet TS and the standard sheet SS being set, the scanner 150 reads the measurement pattern and the standard pattern. At this time, due to the influence of reading position error, the image of the measurement pattern in the reading result becomes a distorted image compared to the actual measurement pattern. Similarly, the image of the standard pattern also becomes a distorted image compared to the actual standard pattern.

It should be noted that the image of the measurement pattern in the reading result receives not only the influence of reading position error, but also the influence of transport error of the printer 1. On the other hand, the standard pattern is formed at a uniform interval without any relation with transport error of the printer, and therefore the image of the standard pattern receives the influence of reading position error in the scanner 150 but does not receive the influence of transport error of the printer 1.

Consequently, the program for obtaining correction values cancels the influence of reading position error in the image of the measurement pattern based on the image of the standard pattern when calculating correction values based on the image of the measurement pattern.

Calculation of Correction Values (S103)

Before describing the calculation of correction values, description is given concerning the image data obtained from the scanner 150. Image data is constituted by a plurality of pixel data. Each pixel data indicates a tone value of the corresponding pixel. When ignoring the scanner reading error, each pixel corresponds to a size of $\frac{1}{720}$ inch×$\frac{1}{720}$ inch. An image (digital image) is constituted having pixels such as these as a smallest structural unit, and image data is data that indicates such an image.

Figure 13:
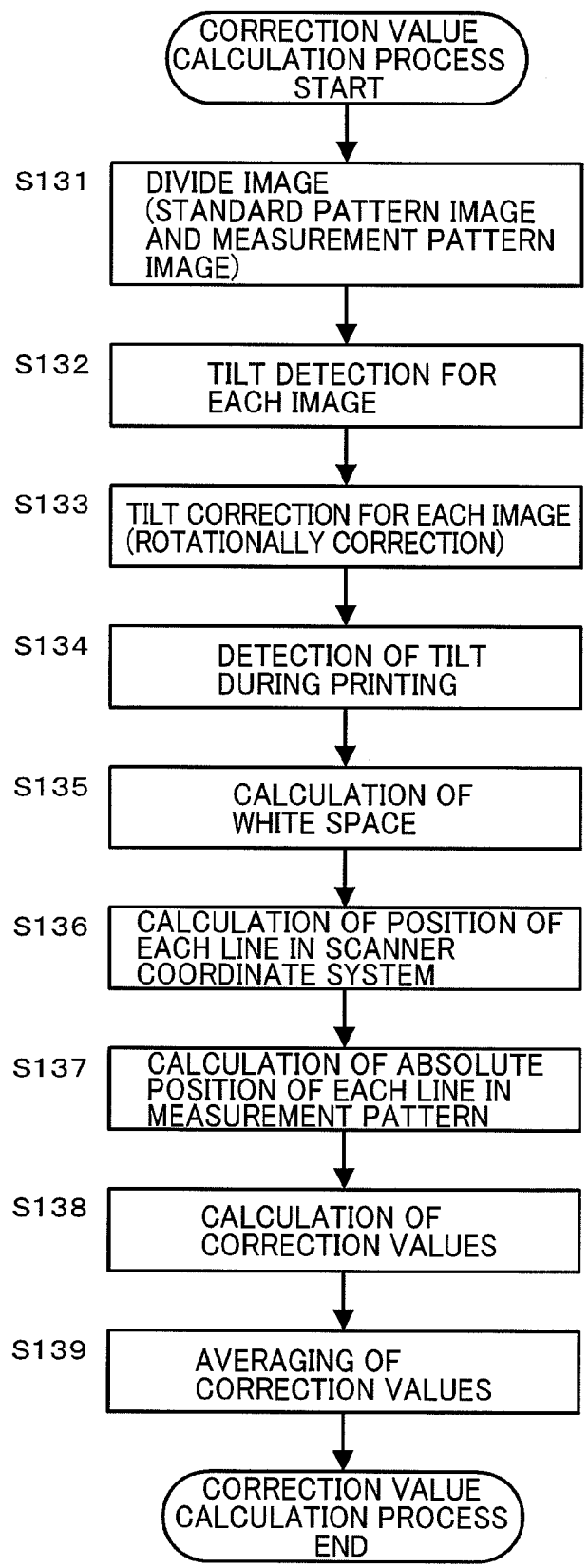
FIG. 13 is a flowchart of a correction value calculating process in S103.

FIG. 13 is a flowchart of a correction value calculating process in S103. The computer 110 executes each process in accordance with the program for obtaining correction values. That is, the program for obtaining correction values includes code for making the computer 110 perform each process.

Image Division (S131)

First, the computer 110 divides into two the image indicated by image data obtained from the scanner 150 (S131).

Figure 14:
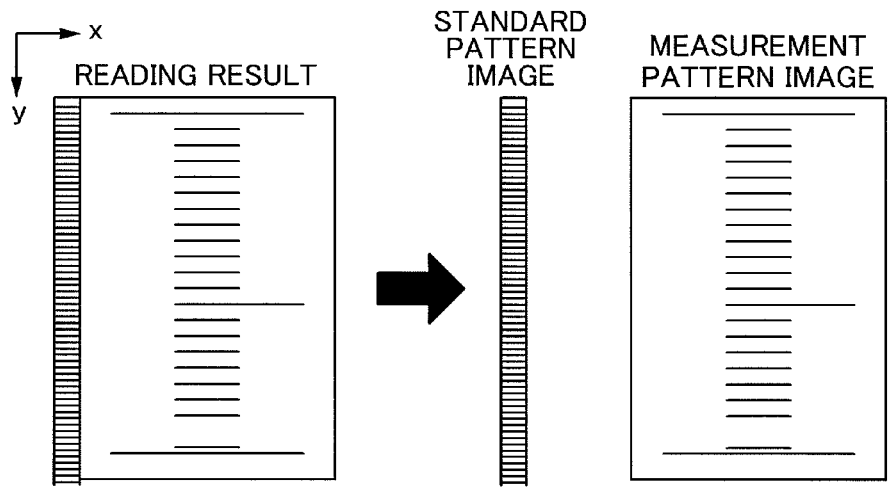
FIG. 14 is an explanatory diagram of image division (S131).

FIG. 14 is an explanatory diagram of image division (S131). On the left side of the diagram, an image indicated by image data obtained from the scanner is drawn. On the right side of the diagram, a divided image is drawn. In the following description, the lateral direction (horizontal direction) in FIG. 14 is referred to as the x direction and the vertical direction (perpendicular direction) in FIG. 14 is referred to as the y direction. Each line in the image of the standard pattern are substantially parallel to the x direction and each line in the image of the measurement pattern are also substantially parallel to the x direction.

The computer 110 divides the image into two by extracting an image of a predetermined range from the image of the reading result. By dividing the image of the reading result into two, one of the images indicates an image of the standard pattern and the other image indicates an image of the measurement pattern. A reason of dividing the image in this manner is that there is a risk that the standard sheet SS and the test sheet TS are set in the scanner 150 tilted respectively, and therefore tilt correction (S133) is performed on these separately.

Image Tilt Detection (S132)

Next, the computer 110 detects the tilt of the images (S132).

Figure 15A:
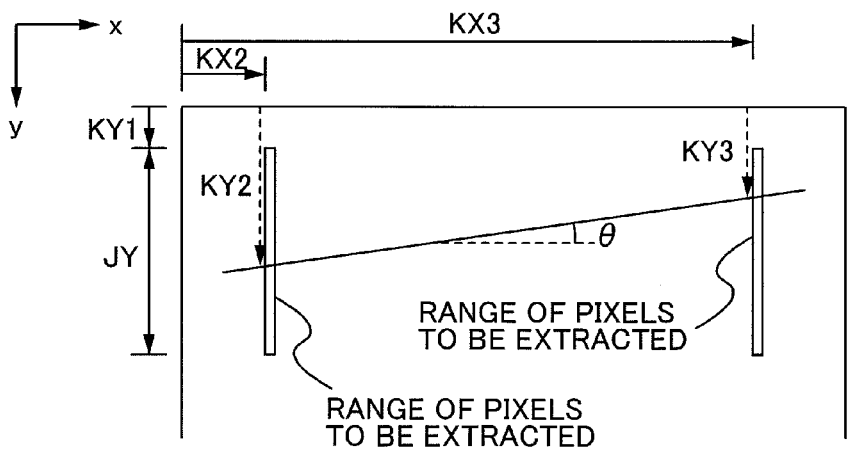
FIG. 15A is an explanatory diagram describing how a tilt of an image of the measurement pattern is detected.

FIG. 15A is an explanatory diagram of a state in which tilt of an image of the measurement pattern is detected. The computer 110 extracts a JY number of pixels from the KY1-th pixel from the top of the KX2-th pixels from the left, from the image data. Similarly, the computer 110 extracts a JY number of pixels from the KY1-th pixel from the tope of the KX3-th pixels from the left, from the image data. It should be noted that the parameters KX2, KX3, KY1, and JY are set so that pixels indicating the line L1 are contained in the pixels to be extracted.

Figure 15B:
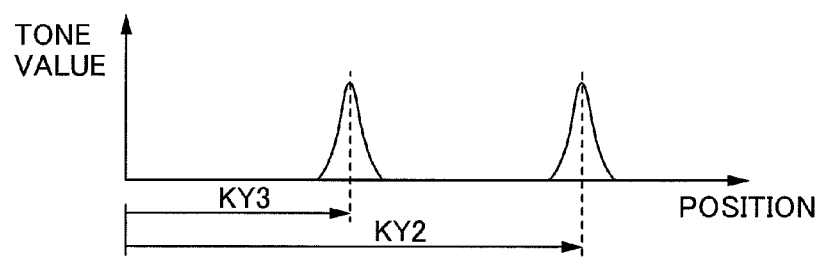
FIG. 15B is a graph of tone values of extracted pixels.

FIG. 15B is a graph of tone values of extracted pixels. The lateral axis indicates pixel positions (Y coordinates). The vertical axis indicates the tone values of the pixels. The computer 110 obtains centroid pixels KY2 and KY3 respectively based on pixel data of the JY number of pixels that have been extracted.

Then, the computer 110 calculates a tilt θ of the line L1 using the following expression:

$$\theta = \tan^{-1}\{(KY2-KY3)/(KX2-KX3)\}$$

It should be noted that the computer 110 detects not only the tilt of the image of the measurement pattern but also the tilt of the image of the standard pattern. The method for detecting the tilt of the image of the standard pattern is substantially the same as the above method, and therefore description thereof is omitted.

Image Tilt Correction (S133)

Next, the computer 110 corrects the image tilt by performing a rotation process on the image based on the tilt θ detected at S132 (S133). The image of measurement pattern is rotationally corrected based on a tilt result of the image of the measurement pattern, and the image of the standard pattern is rotationally corrected based on a tilt result of the image of the standard pattern.

A bilinear technique is used in an algorithm for processing rotation of the image. This algorithm is well known, and therefore description thereof is omitted.

Tilt Detection when Printing (S134)

Next, the computer 110 detects the tilt (skew) when printing the measurement pattern (S134). When the lower end of the test sheet passes through the transport roller while printing the measurement pattern, sometimes the lower end of the test sheet contacts the head 41 and the test sheet moves. When this occurs, the correction values that are calculated using this measurement pattern become inappropriate. Consequently, by detecting the tilt at the time of printing the measurement pattern, whether or not the lower end of the test sheet has made contact with the head 41 is detected, and if contact has been made, an error is given.

Figure 16:
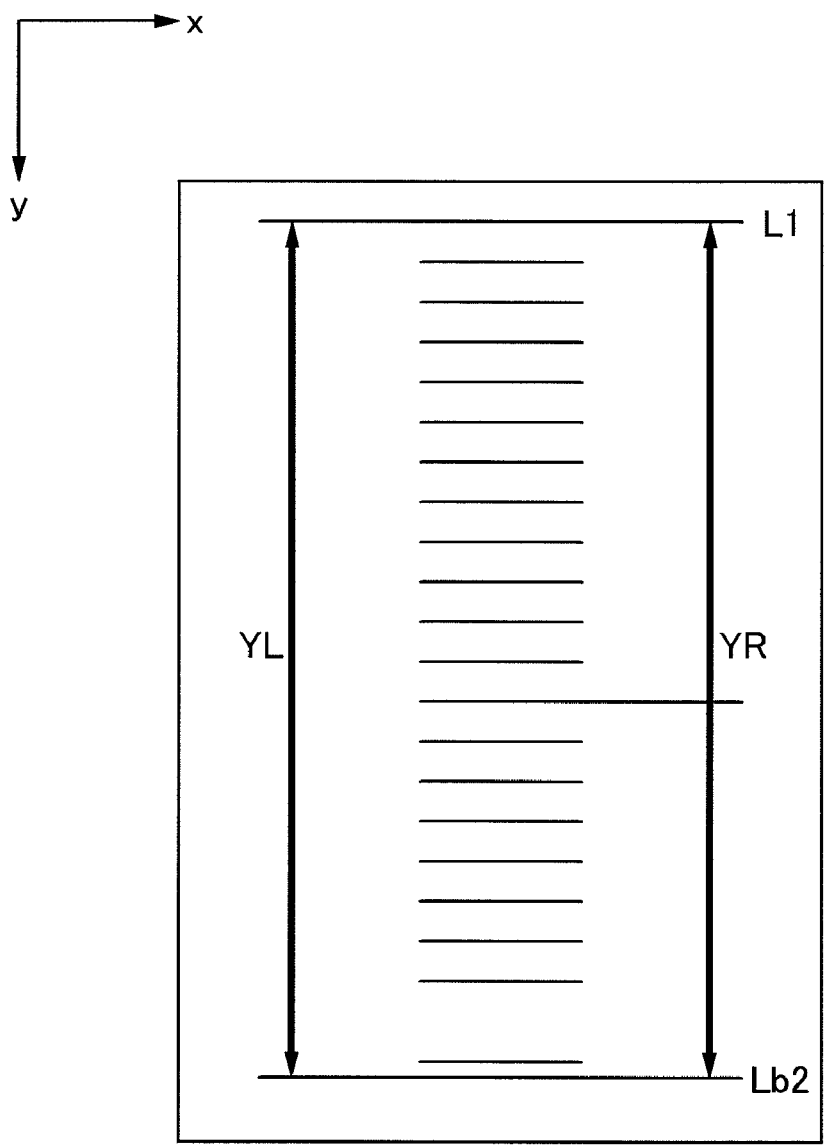
FIG. 16 is an explanatory diagram describing how a tilt of the measurement pattern at the time of printing is detected.

FIG. 16 is an explanatory diagram of a state in which tilt of the measurement pattern at the time of printing is detected. First, the computer 110 detects a left side interval YL and a right side interval YR between the line L1 (the uppermost line) and the line Lb2 (the most bottom line, which is a line formed after the lower end has passed through the transport roller). Then the computer 110 calculates a difference between the interval YL and the interval YR and proceeds to the next process (S135) if this difference is within a predetermined range, but gives an error if this difference is outside the predetermined range.

Calculating an Amount of White Space (S135)

Next, the computer 110 calculates a white space amount (S135).

Figure 17:
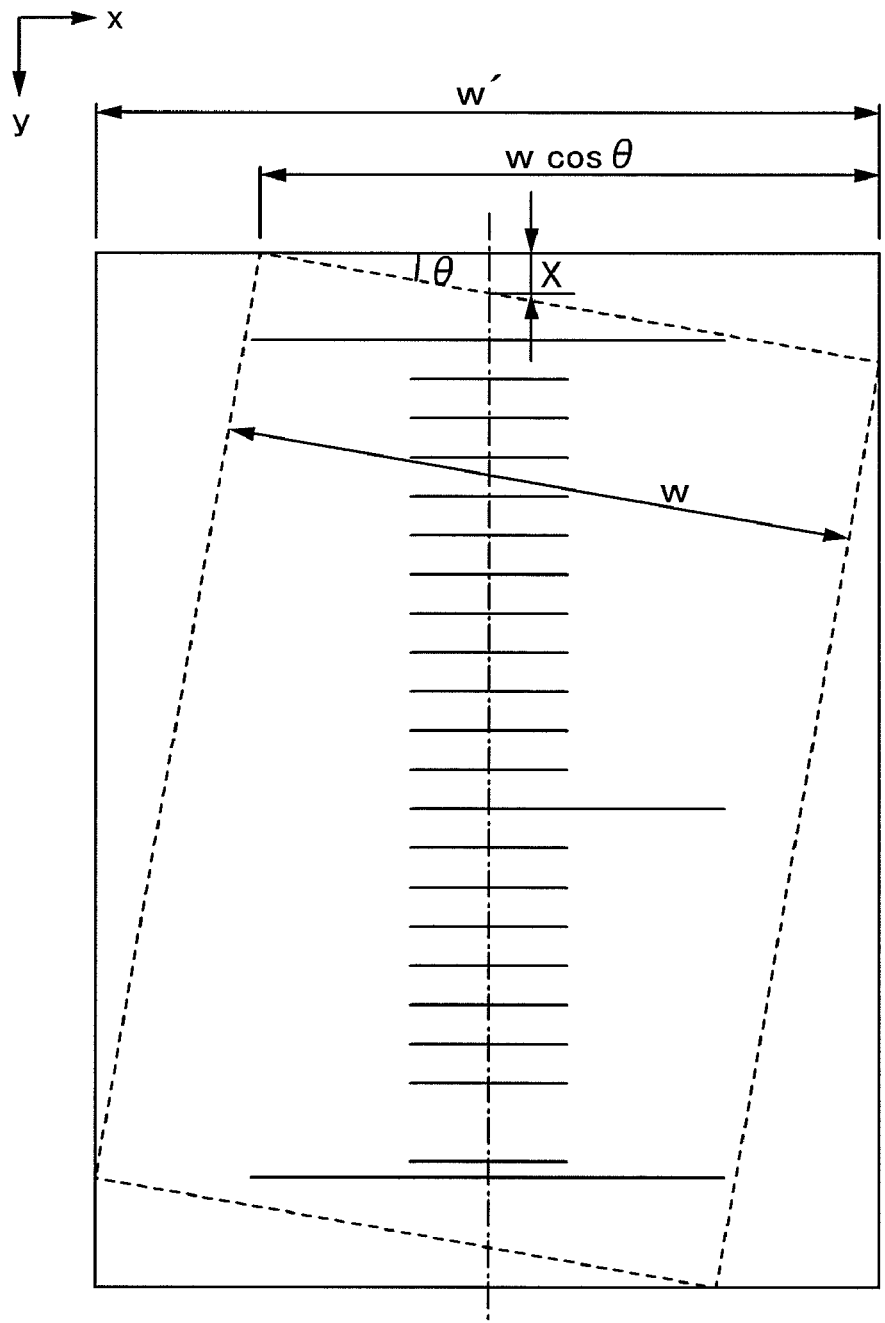
FIG. 17 is an explanatory diagram of a white space amount X.

FIG. 17 is an explanatory diagram of a white space amount X. The solid line quadrilateral (outer side quadrilateral) in FIG. 17 indicates an image after rotational correction of S133. The dotted line quadrilateral (inner side slanted quadrilateral) in FIG. 17 indicates an image prior to the rotational correction. In order to make the image after rotational correction in a rectangular shape, white spaces of right-angled triangle shapes are added to the corners of the rotated image when carrying out rotational correction processing of S133.

Supposing the tilt of the standard sheet SS and the tilt of the test sheet TS are different, the added white space amount will be different, and the positions of the lines in the measurement pattern with respect to the standard pattern will be relatively displaced before and after the rotational correction (S133). Accordingly, the computer 110 obtains the white space amount X using the following expression and prevents displacement of the positions of the lines of the measurement pattern with respect to the standard pattern by subtracting the white space amount X from the line positions calculated in S136.

$$X = (w \cos \theta - W'/2) \times \tan \theta$$

Line Position Calculations in Scanner Coordinate System (S136)

Next, the computer 110 calculates the line positions of the standard pattern and the line positions of the measurement pattern respectively in a scanner coordinate system (S136).

The scanner coordinate system refers to a coordinate system when the size of one pixel is $1/720 \times 1/720$ inches. There is reading position error in the scanner 150 and when considering reading position error, strictly speaking the actual region corresponding to each pixel data does not become $1/720$ inches $\times 1/720$ inches, but in the scanner coordinate system the size of the region (pixel) corresponding to each pixel data is set to $1/720 \times 1/720$ inches. Furthermore, a position of the upper left pixel in each image is set as an origin in the scanner coordinate system.

Figure 18A:
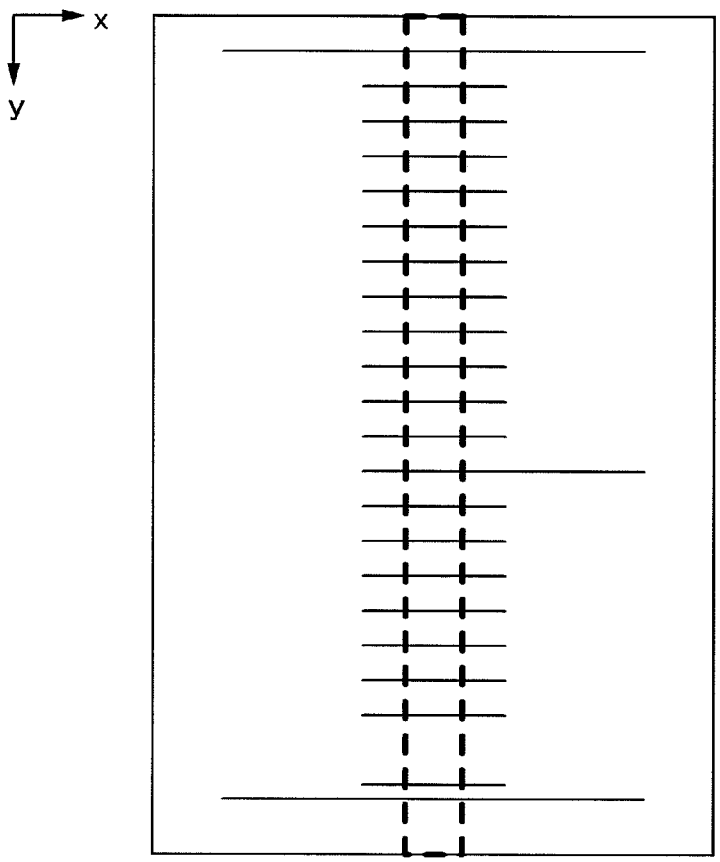
FIG. 18A is an explanatory diagram of an image range used in calculating line positions.
Figure 18B:
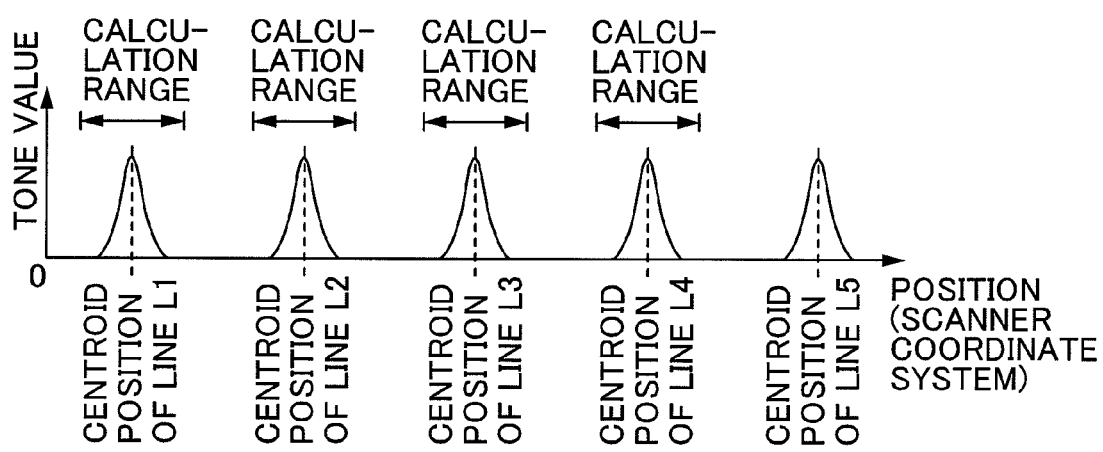
FIG. 18B is an explanatory diagram of calculating line positions.

FIG. 18A is an explanatory diagram of an image range used in calculating line positions. The image data of the image in the range indicated by the dotted line in FIG. 18A is used in calculating the line positions. FIG. 18B is an explanatory diagram of calculating line positions. The horizontal axis indicates y direction positions of pixels (scanner coordinate system). The vertical axis indicates tone values of the pixels (average values of tone values of pixels lined up in the x direction).

The computer 110 obtains a position of a peak value of the tone values and sets a predetermined calculation range centered on this position. Then, based on the pixel data of pixels in this calculation range, a centroid position of tone values is calculated, and this centroid position is set as the line position.

Figures 19, 20:
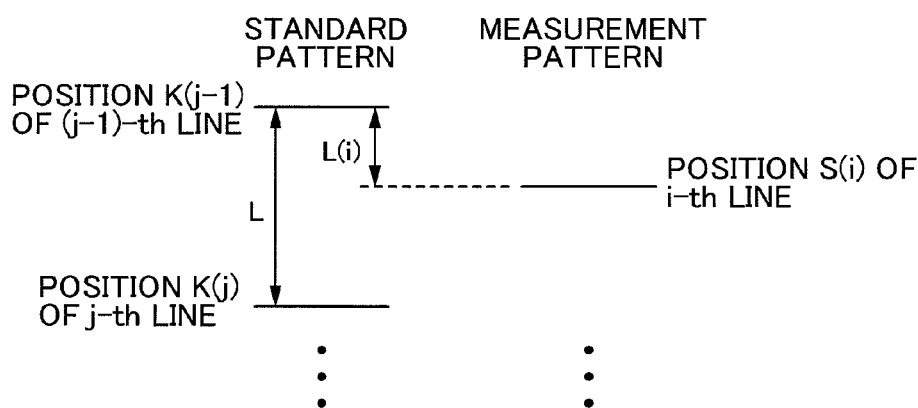
FIG. 19 is an explanatory diagram of calculated line positions.
FIG. 20 is an explanatory diagram of calculating absolute positions of i-th line in the measurement pattern.

FIG. 19 is an explanatory diagram of calculated line positions (Note that positions shown in FIG. 19 have undergone a predetermined calculation to be made dimensionless). In regard to the standard pattern, despite being constituted by lines having uniform intervals, its calculated line positions do not have uniform intervals when attention is given to the centroid positions of each line in the standard pattern. This is conceived as an influence of reading position error of the scanner 150.

Note that, the process of S136 is described in detail later.

Calculating Absolute Positions of Lines in Measurement Pattern (S137)

Next, the computer 110 calculates the absolute positions of lines in the measurement pattern (S137).

FIG. 20 is an explanatory diagram of calculating absolute positions of an i-th line in the measurement pattern. Here, the i-th line of the measurement pattern is positioned between a (j−1)-th line of the standard pattern and a j-th line of the standard pattern. In the following description, the position (scanner coordinate system) of the i-th line in the measurement pattern is referred to as "S(i)" and the position (scanner coordinate system) of the j-th line in the standard pattern is referred to as "K(j)". Furthermore, the interval (y direction interval) between the (j−1)-th line and the j-th line of the standard pattern is referred to as "L" and the interval (y direction interval) between the (j−1)-th line of the standard pattern and the i-th line of the measurement pattern is referred to as "L(i)."

First, the computer 110 calculates a ratio H of the interval L(i) with respect to the interval L based on the following expression:

$$H = L(i)/L$$
$$= \{S(i) - K(j-1)\}/\{K(j) - K(j-1)\}$$

Incidentally, the standard pattern on the actual standard sheet SS are at uniform intervals, and therefore when the absolute position of the first line of the standard pattern is set to zero, the position of an arbitrary line in the standard pattern can be calculated. For example, the absolute position of the second line in the standard pattern is 1/36 inch. Accordingly, when the absolute position of the j-th line in the standard pattern is referred to as "J(j)" and the absolute position of the i-th line in the measurement pattern is referred to as "R(i)", R(i) can be calculated as shown in the following expression:

$$R(i)=\{J(j)-J(j-1)\}\times H+J(j-1)$$

Here, description is given concerning a specific procedure for calculating the absolute position of the first line of the measurement pattern in FIG. 19. First, based on the value (373.768667) of S(1), the computer 110 detects that the first line of the measurement pattern is positioned between the second line and the third line of the standard pattern. Next, the computer 110 calculates that the ratio H is 0.401−43008 (=(373.7686667−309.613250)/(469.430−413−309.613250)). Next, the computer 110 calculates that an absolute position R(1) of the first line of the measurement pattern is 0.98878678 mm (=0.038928613 inches={1/36 inch}×0.401−43008+1/36 inch).

In this manner, the computer 110 calculates the absolute positions of lines in the measurement pattern.

Calculating Correction Values (S138)

Next, the computer 110 calculates correction values each corresponding to transport operations of multiple times carried out when the measurement pattern is formed (S138). Each of the correction values is calculated based on a difference between a logic line interval and an actual line interval.

A correction value C(i) of the transport operation carried out between the pass i and the pass i+1 is a value in which "R(i+1)−R(i)" (the actual interval between the absolute position of the line Li+1 and the line Li) is subtracted from "6.35 mm" (¼ inch, that is, the logic interval between the line Li and the line Li+1). For example, the correction value C(1) of the transport operation carried out between the pass 1 and the pass 2 is 6.35 mm−{R(2)−R(1)}. The computer 110 calculates the correction value C(1) to the correction value C(19) in this manner.

However, when calculating correction values using the lines Lb1 and Lb2, which are below the NIP line (upstream side in the transport direction), the logic interval between the line Lb1 and the line Lb2 is calculated as "0.847 mm" (=3/90 inch). The computer 110 calculates the correction value Cb of the non NIP state in this manner.

Figure 21:
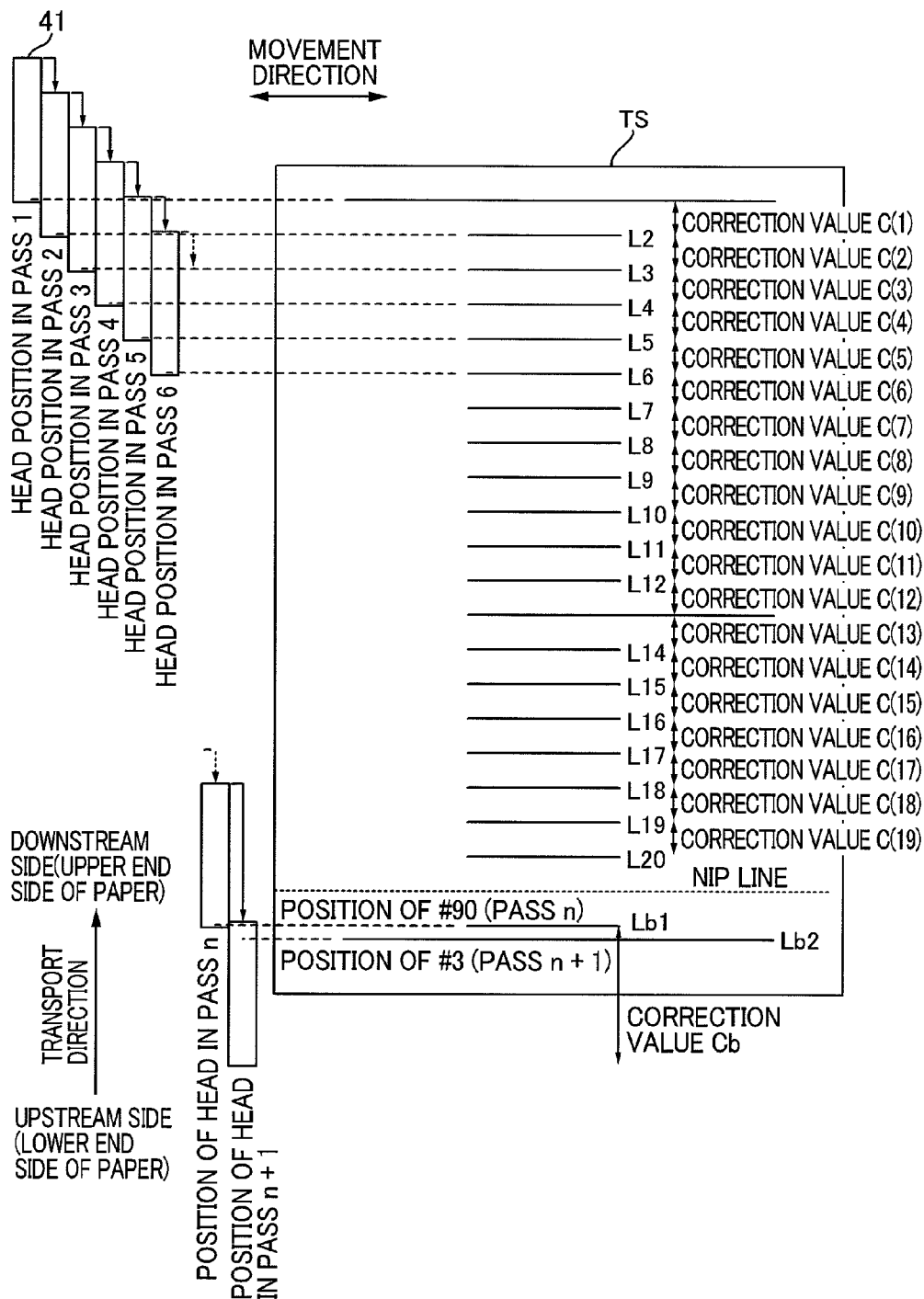
FIG. 21 is an explanatory diagram of a range corresponding to the correction values C(i).

FIG. 21 is an explanatory diagram of a range corresponding to the correction values C(i). Supposing that a value of the correction value C(1) subtracted from the initial target transport amount is set as the target in the transport operation between the pass 1 and the pass 2 when printing the measurement pattern, then the actual transport amount should become precisely ¼ inch (=6.35 mm). Similarly, supposing that a value of the correction value Cb subtracted from the initial target transport amount is set as the target in the transport operation between the pass n and the pass n+1 when printing the measurement pattern, then the actual transport amount should become precisely 1 inch.

Averaging the Correction Values (S139)

In this regard, the rotary encoder 52 of this embodiment is not provided with an origin sensor, and therefore although the controller 60 can detect the rotation amount of the transport roller 23, it does not detect the rotation position of the transport roller 23. For this reason, the printer 1 cannot guarantee the rotation position of the transport roller 23 at the commencement of transport. That is, each time printing is performed, there is a risk that the rotation position of the transport roller 23 at the commencement of transport differs. On the other hand, the interval between two adjacent lines in the measurement pattern is affected not only by the DC component transport error when transported by ¼ inch, but is also affected by the AC component transport error.

Consequently, if the correction value C that is calculated based on the interval between two adjacent lines in the measurement pattern is applied as it is when correcting the target transport amount, there is a risk that the transport amount will not be corrected properly due to the influence of AC component transport error. For example, even when carrying out a transport operation of the ¼ inch transport amount between the pass 1 and the pass 2 in the same manner as when printing the measurement pattern, if the rotation position of the transport roller 23 at the commencement of transport is different to that at the time of printing the measurement pattern, then the transport amount will not be corrected properly even though the target transport amount is corrected with the correction value C(1). If the rotation position of the transport roller 23 at the commencement of transport is 180° different compared to that at the time of printing the measurement pattern, then due to the influence of AC component transport error, not only will the transport amount not be corrected properly, but it is possible that the transport error will get worse.

Accordingly, in this embodiment, in order to correct only the DC component transport error, a correction amount Ca for correcting DC component transport error is calculated by averaging four correction values C as in the following expression:

$$Ca(i)=\{C(i-1)+C(i)+C(i+1)+C(i+2)\}/4$$

Here, description is given as a reason for being able to calculate the correction values Ca for correcting DC component transport error by the above expression.

As above mentioned, the correction value C(i) of the transport operation carried out between the pass i and the pass i+1 is a value in which "R(i+1)−R(i)" (the actual interval between the absolute position of the line Li+1 and the line Li) is subtracted from "6.35 mm" (¼ inch, that is, the logic interval between the line Li and the line Li+1). Then, the above expression for calculating the correction values Ca possesses a meaning as in the following expression:

$$Ca(i)=[25.4 \text{ mm}-\{R(i+3)-R(i-1)\}]/4$$

That is, the correction value Ca(i) is a value in which a difference between an interval of two lines that should be separated by one inch in logic (the line Li+3 and the line Li−1) and one inch (the transport amount of one rotation of the transport roller 23) is divided by four. For this reason, the correction values Ca(i) are values for correcting ¼ of the transport error produced when the paper S is transported by one inch (the transport amount of one rotation of the transport roller 23). Then, the transport error produced when the paper S is transported by one inch is DC component transport error, and no AC component transport error is contained within this transport error.

Therefore, the correction values Ca(i) calculated by averaging four correction values C are not affected by AC component transport error, and are values that reflect DC component transport error.

Figures 22, 23:
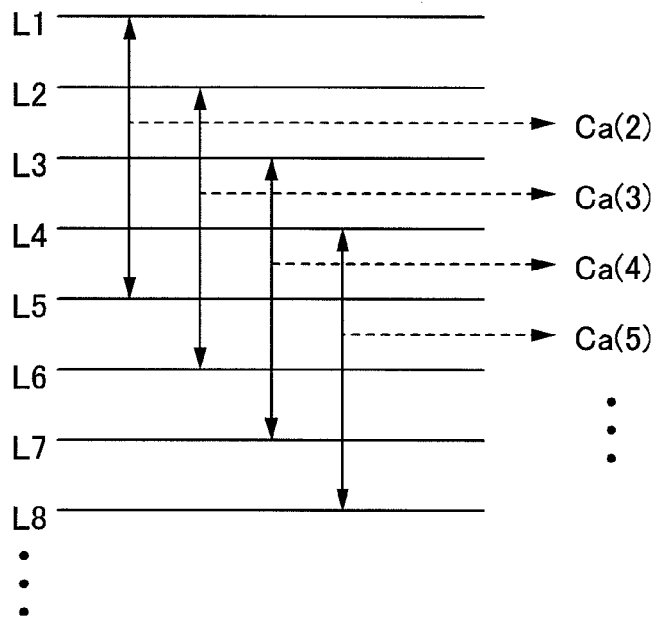
FIG. 22 is an explanatory diagram of a relationship between the lines of the measurement pattern and the correction values Ca.
FIG. 23 is an explanatory diagram of a table stored in the memory 63.

FIG. 22 is an explanatory diagram of a relationship between the lines of the measurement pattern and the correction values Ca. As shown in FIG. 22, the correction values Ca(i) are values corresponding to an interval between the line Li+3 and the line L−1. For example, the correction value Ca(2) is a value corresponding to the interval between the line L5 and the line L1. Furthermore, since the lines in the measurement pattern are formed at substantially each ¼ inch, the correction value Ca can be calculated for each ¼ inch. For this reason, the correction values Ca(i) can be set such that each correction value Ca has an application range of ¼ inch regardless of the value corresponding to the interval between two lines that should be separated by 1 inch in logic. That is, in this embodiment, the correction values for correcting DC component transport error can be set for each ¼ inch range rather than for each one inch range corresponding to one rotation of the transport roller 23. In this way, fine corrections can be performed on DC component transport error (see the dotted line in FIG. 6), which fluctuates in response to the total transport amount.

It should be noted that the correction value Ca(2) of the transport operation carried out between the pass 2 and the pass 3 is calculated at a value in which a sum total of the correction values C(1) to C(4) are divided by four (an average value of the correction values C(1) to C(4)). In other words, the correction value Ca(2) is a value corresponding to the interval between the line L1 formed in the pass 1 and the line L5 formed in the pass 5 after one inch of transport has been performed after the forming of the line L1.

Furthermore, when i−1 goes below zero in calculating the correction values Ca(i), C(1) is applied for the correction value C(i−1). For example, the correction value Ca(1) of the transport operation carried out between the pass 1 and the pass 2 is calculated as {C(1)+C(1)+C(2)+C(3)}/4. Furthermore, when i+1 goes above 20 in calculating the correction values Ca(i), C(19) is applied for C(i+1) for calculating the correction value Ca. Similarly, when i+2 goes above 20, C(19) is applied for C(i+2). For example, the correction value Ca(19) of the transport operation carried out between the pass 19 and the pass 20 is calculated as {C(18)+C(18)+C(19)+C(19)}/4.

The computer 110 calculates the correction values Ca(1) to the correction value Ca(19) in this manner. In this way, the correction values for correcting DC component transport error are obtained for each ¼ inch range.

Storing Correction Values (S104)

Next, the computer 110 stores the correction values in the memory 63 of the printer 1 (S104).

FIG. 23 is an explanatory diagram of a table stored in the memory 63. The correction values stored in the memory 63 are correction values Ca(1) to Ca(19) in the NIP state and the correction value Cb in the non NIP state. Furthermore, border position information for indicating the range in which the correction values are applied is also associated with each correction value and stored in the memory 63.

The border position information associated with the correction values Ca(i) is information that indicates a position (logic position) corresponding to the line Li+1 in the measurement pattern, and this border position information indicates a lower end side border of the range in which the correction values Ca(i) are applied. It should be noted that the upper end side border can be obtained from the border position information associated with the correction value Ca(i−1). Consequently, the applicable range of the correction value C(2) for example is a range between the position of the line L1 and the position of the line L2 with respect to the paper S (at which the nozzle #90 is positioned). It should be noted that the range for the non NIP state is already known, and therefore there is no need to associate border position information with the correction value Cb.

At the printer manufacturing factory, a table reflecting the individual characteristics of each individual printer is stored in the memory 63 for each printer that is manufactured. Then, the printer in which this table has been stored is packaged and shipped.

Transport Operation During Printing by Users

When printing is carried out by a user who has purchased the printer, the controller 60 reads out the table from the memory 63 and corrects the target transport amount based on the correction values, then carries out the transport operation based on the corrected target transport amount. The following is a description concerning a state of the transport operation during printing by the user.

Figure 24A:
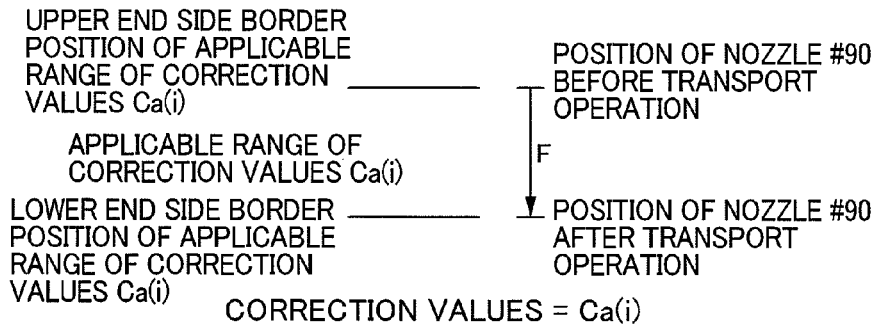
FIG. 24A is an explanatory diagram of correction values in a first case.

FIG. 24A is an explanatory diagram of correction values in a first case. In the first case, the position of the nozzle #90 before the transport operation (the relative position with respect to the paper) matches the upper end side border position of the applicable range of the correction values Ca(i), and the position of the nozzle #90 after the transport operation matches the lower end side border position of the applicable range of the correction values Ca(i). In this case, the controller 60 sets the correction values to Ca(i), sets as a target a value in which the correction value Ca(i) is added to an initial target transport amount F, then drives the transport motor 22 to transport the paper.

Figure 24B:
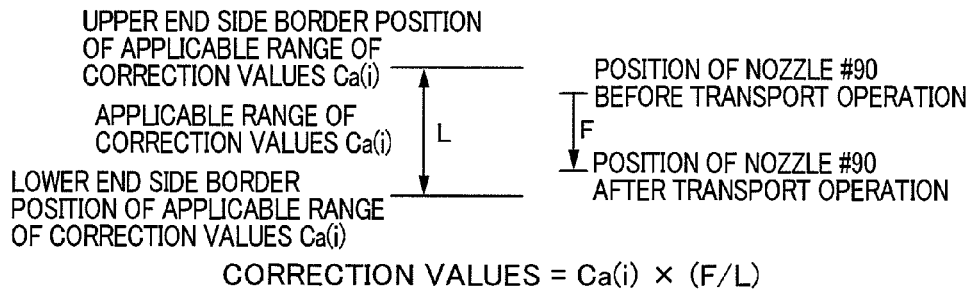
FIG. 24B is an explanatory diagram of correction values in a second case.

FIG. 24B is an explanatory diagram of correction values in a second case. In the second case, the positions of the nozzle #90 before and after the transport operation are both within the applicable range of the correction values Ca(i). In this case, the controller 60 sets as a correction value a value in which a ratio F/L between the initial target transport amount F and a transport direction length L of the applicable range is multiplied by Ca(i). Then, the controller 60 sets as a target a value in which the correction value Ca(i) multiplied by (F/L) is added to the initial target transport amount F, then drives the transport motor 22 and transports the paper.

Figure 24C:
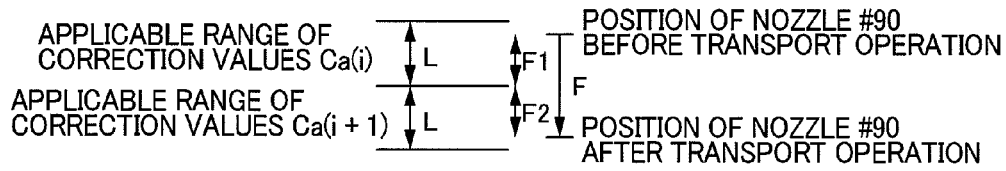
FIG. 24C is an explanatory diagram of correction values in a third case.

FIG. 24C is an explanatory diagram of correction values in a third case. In the third case, the position of the nozzle #90 before the transport operation is within the applicable range of the correction values Ca(i), and the position of the nozzle #90 after the transport operation is within the applicable range of the correction values Ca(i+1). Here, of the target transport amounts F, the transport amount in the applicable range of the correction values Ca(i) is set as F1, and the transport amount in the applicable range of the correction values Ca(i+1) is set as F2. In this case, the controller 60 sets as the correction value a sum of a value in which Ca(i) is multiplied by F1/L and a value in which Ca(i+1) is multiplied by F2/L. Then, the controller 60 sets as a target a value in which the correction value is added to the initial target transport amount F, then drives the transport motor 22 and transports the paper.

Figure 24D:
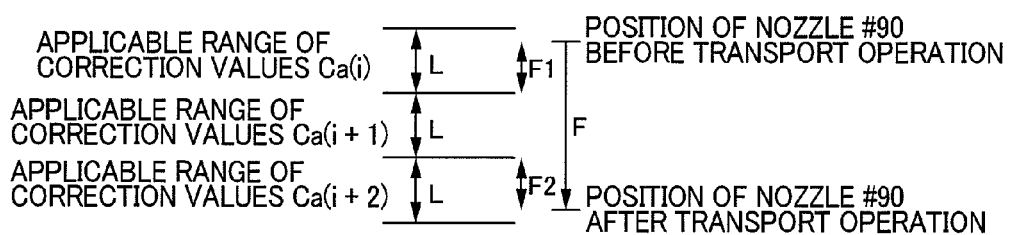
FIG. 24D is an explanatory diagram of correction values in a fourth case.

FIG. 24D is an explanatory diagram of correction values in a fourth case. In the fourth case, the paper is transported so as to pass the applicable range of the correction values Ca(i+1). In this case, the controller 60 sets as the correction value a sum of a value in which Ca(i) is multiplied by F1/L, Ca(i+1), and a value in which Ca(i+2) is multiplied by F2/L. Then, the controller 60 sets as a target a value in which the correction value is added to the initial target transport amount F, then drives the transport motor 22 and transports the paper.

In this way, when the controller corrects the initial target transport amount F and controls the transport unit based on the corrected target transport amount, the actual transport amount is corrected so as to become the initial target transport amount F, and the DC component transport error is corrected.

Incidentally, in calculating the correction values as described above, when the target transport amount F is small, the correction value will also be a small value. If the target transport amount F is small, it can be conceived that the transport error produced when carrying out the transport will also be small, and therefore by calculating the correction values in the above manner, correction values that match the transport error produced during transport can be calculated. Furthermore, an applicable range is set for each ¼ inch with respect to each of the correction values Ca, and therefore this enables the DC component transport error, which fluctuates in response to the relative positions of the paper S and the head 41 to be corrected accurately.

It should be noted that when carrying out transport in the non NIP state, the target transport amount is corrected based on the correction value Cb. When the transport amount in the non NIP state is F, the controller 60 sets as a correction value a value in which the correction value Cb is multiplied by F/L. However, in this case, L is set as one inch regardless of the range of the non NIP state. Then, the controller 60 sets as a target a value in which the correction value (Cb×F/L) is added to the initial target transport amount F, then drives the transport motor 22 and transports the paper.

Detailed Description of Line Position Calculating

Here, further detailed description is given concerning line position calculating (S136) in the scanner coordinate system in correction value calculating (S103).

Basic Flow

Figure 25:
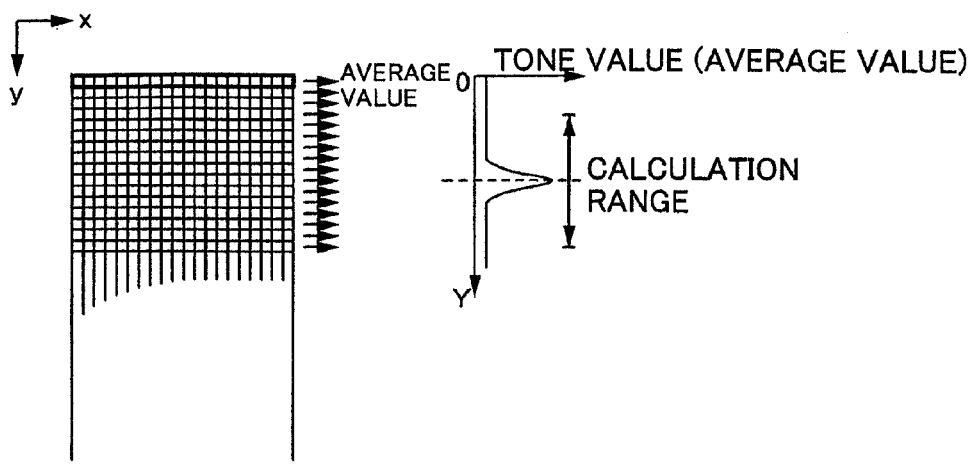
FIG. 25 is an explanatory diagram of a state of calculating line positions.

FIG. 25 is an explanatory diagram of a state of calculating line positions.

The left side of the diagram shows image data of a range indicated by the dotted lines in FIG. 18A. This image data is constituted by pixel data of pixels arranged in a matrix form. In the image data, a predetermined number of pixels are arranged in an x direction. Hereinafter, the pixel group in a region surrounded by a bold line in the diagram is referred to as "pixel row."

In calculating line positions, the computer 110 calculates an average value of the pixel data of each pixel row. The average value is associated with a y-direction position of the pixel row and becomes as shown on the right side of the diagram when made into a graph. This graph is the same as the graph of FIG. 18B.

The computer 110 obtains the pixel row whose tone value is a peak value and determines a predetermined range of a plurality of pixel rows centered on this pixel row as the calculation range. Then, based on the tone values of the pixel rows in this calculation range, a centroid position of tone values in this calculation range is calculated, and this centroid position is calculated as the line position.

Influence of Defective Pixels

Figure 26A:
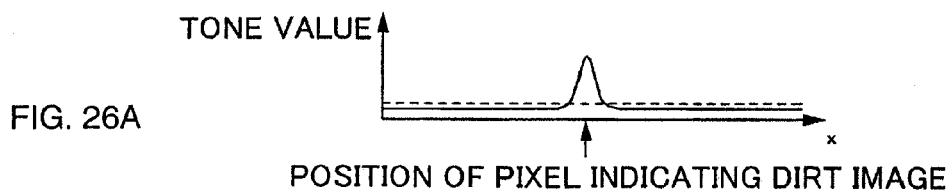
FIG. 26A is a graph of tone values in a pixel row in a case where there is dirt on the reference sheet or test sheet.

FIG. 26A is a graph of tone values in a pixel row in a case where there is dirt on the reference sheet or test sheet. The horizontal axis in the graph indicates the x-direction position of pixels in the pixel row. The vertical axis indicates the tone values of the pixels. The graph of the solid line indicates the tone value of each pixel. The graph of the dotted line indicates the average value of pixel data (tone values) of the pixel row.

When there is a pixel indicating a dirt image in the pixel row, the average value of the pixel data of the pixel row becomes undesirably high. When a pixel row of this kind is present in the calculation range, the calculation of the line position is affected undesirably. For example, when a pixel row whose average value has become higher due to the influence of dirt is present in an upper part (−y direction) of the calculation range, the line position is calculated undesirably as being above its actual position. As a result, a correct correction value cannot be calculated and there is a risk that transport error will not be corrected accurately.

Figure 26B:
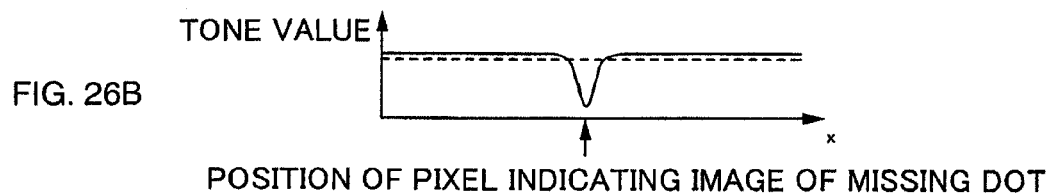
FIG. 26B is a graph of tone values in a pixel row indicating an image of a line in a case where there is a missing dot.

FIG. 26B is a graph of tone values in a pixel row indicating an image of a line in a case where there is a missing dot.

When there is a missing dot in a dot row constituted by measurement pattern lines, the average value of the pixel data of the pixel row becomes undesirably low. When a pixel row of this kind is present in the calculation range, the calculation of the line position is affected undesirably. As a result, a correct correction value cannot be calculated and there is a risk that transport error will not be corrected accurately.

In this manner, when there is a defective pixel (such as a pixel indicating a dirt image or a pixel indicating an image of a missing dot) in the pixel row, the average value of the pixel data of that pixel row is affected undesirably, and the line position cannot be calculated accurately.

COMPARATIVE EXAMPLE

Figure 27:
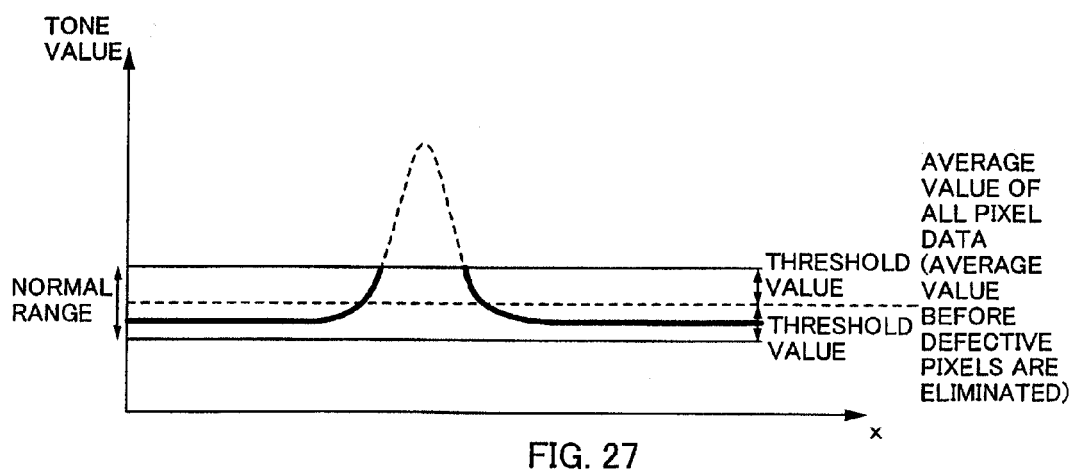
FIG. 27 is an explanatory diagram of a comparative example.

FIG. 27 is an explanatory diagram of a comparative example.

In the comparative example, the computer 110 first calculates an average value of all the pixel data in the pixel row. Next, the computer 110 sets a predetermined threshold value range centered on the average value of all pixel data as a normal range and pixel data outside this normal range is eliminated. That is, pixel data indicated by the dotted line in the diagram is eliminated (pixel data of defective pixels can be eliminated at this time). It should be noted that in the comparative example, the threshold value is a fixed value. Next, the computer 110 calculates an average value of the remaining pixel data (pixel data in the normal range). That is, an average value is calculated for the pixel data indicated by the bold line in the diagram.

By calculating the line position based on the average value of the pixel rows calculated in this comparative example, the influence of defective pixels can be reduced to calculate the line position.

Problems when Line is Tilted

Figure 28A:
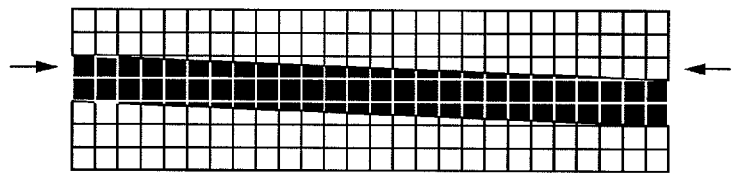
FIG. 28A is an explanatory diagram of a state in which a line in a measurement pattern is tilted.

FIG. 28A is an explanatory diagram of a state in which a line in a measurement pattern is tilted. The black region in the diagram shows a line of a measurement pattern. The grid squares in the diagram correspond to regions of pixels when the measurement pattern is read by the scanner 150.

At S133, tilt in the image of the measurement pattern is corrected in response to the tilt of the line Li. However, if another line is tilted with respect to the line Li, a line other than the line L1 may be tilted even after tilt correction at S133.

When the line is tilted in this manner, a region of the line occupied by pixels at a pixel row on the border of the line (the pixel row indicated by an arrow in the diagram) becomes smaller for pixels to the right in the diagram.

Figure 28B:
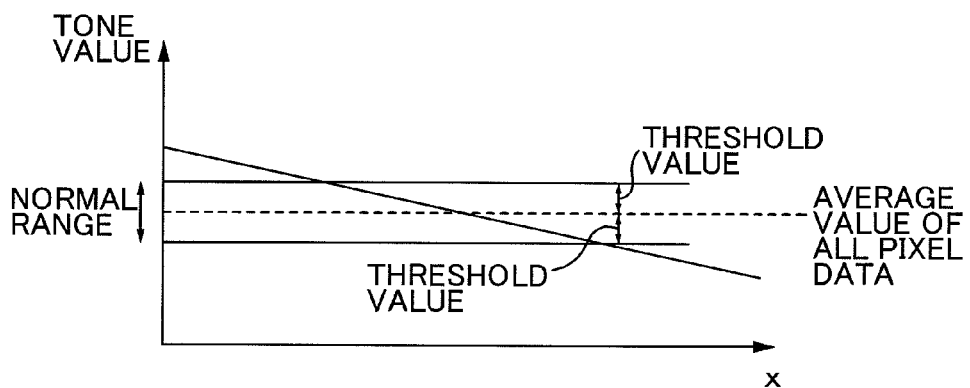
FIG. 28B is a graph of tone values of the pixel row shown by an arrow in FIG. 28A.

FIG. 28B is a graph of tone values of the pixel row shown by the arrow in FIG. 28A. Since the region of the line occupied by pixels becomes smaller for pixels to the right in the diagram, the graph tilts down to the right.

When the predetermined threshold value range centered on the average value of all pixel data is set as the normal range for this kind of pixel row, pixel data of normal pixels, which are not defective pixels, are eliminated undesirably.

Problems when the Threshold Value is Fixed

Figure 29:
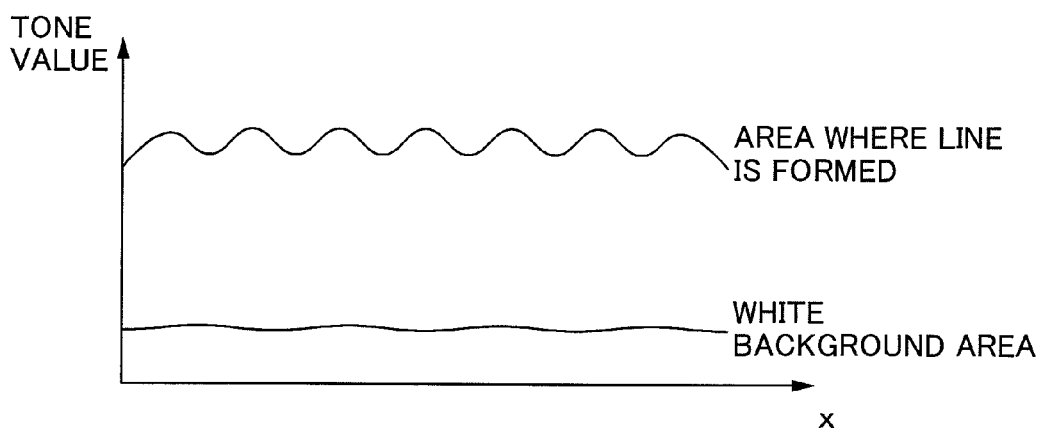
FIG. 29 is a graph showing a case where there is no defective pixel.

FIG. 29 is a graph showing a case where there is no defective pixel. The lower side graph in the diagram is a graph of tone values of a pixel row of an area in which a line is not formed (the white background area of the test sheet). The upper side graph in the diagram is a graph of tone values of a pixel row of an area in which a line is formed (an area where a line is formed).

In areas where the line is not formed, the white background area of the test sheet is read as it is by the scanner 150 and therefore there is little unevenness in the tone values of the pixel row. On the other hand, in areas where the line is formed, the multitude of dots that constitute the line are read by the scanner 150 and therefore there is large unevenness in the tone values of the pixel row.

Since there is little unevenness in the tone values in the white background areas (see the graph at the lower side of FIG. 29), the threshold value shown in FIG. 27 can be set small. However, when a small threshold such as this is applied to the tone values of the pixel row in an area where a line is formed, pixel data of normal pixels, which are not defective pixels, are eliminated undesirably.

On the other hand, since there is large unevenness in the tone values in areas where a line is formed (see the graph at the upper side of FIG. 29), it is necessary to set a large threshold value as shown in FIG. 27 in order not to distinguish normal pixels as defective pixels. However, when a large threshold such as this is applied to the tone values of the pixel row in white background areas, the sensitivity for identifying defective pixels is reduced.

Present Embodiment

Hereinafter, description is given concerning the present embodiment for addressing these problems.

Figure 30:
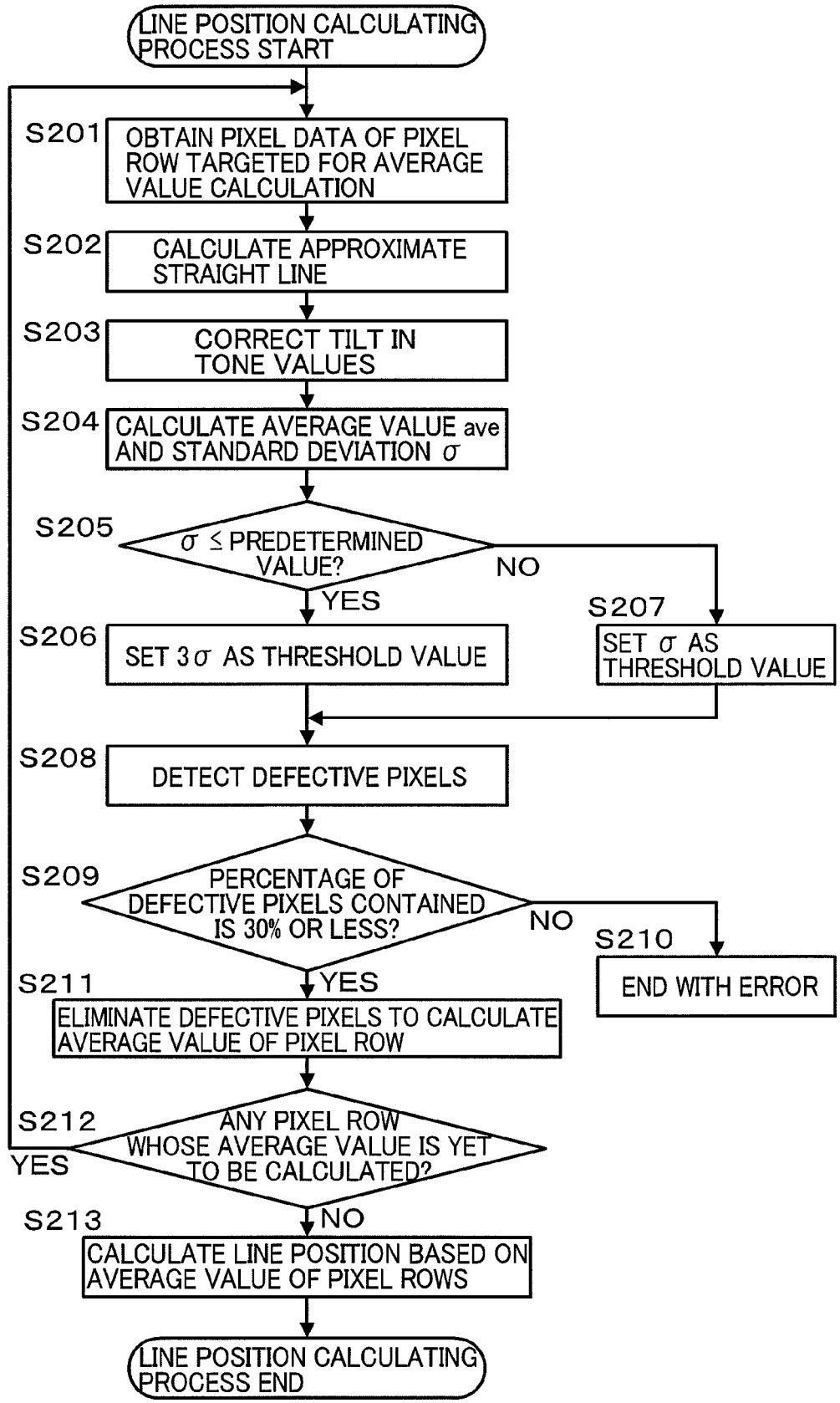
FIG. 30 is a flowchart of a line position calculating process of S136.

FIG. 30 is a flowchart of a line position calculating process of S136. The computer 110 executes each process in accordance with the program for obtaining correction values. That is, the program for obtaining correction values contains code for causing each process to be executed in the computer 110.

First, the computer 110 obtains pixel data of the pixel row targeted for average value calculation (S201). Next, the computer 110 calculates an approximate straight line of the pixel data.

Figure 31A:
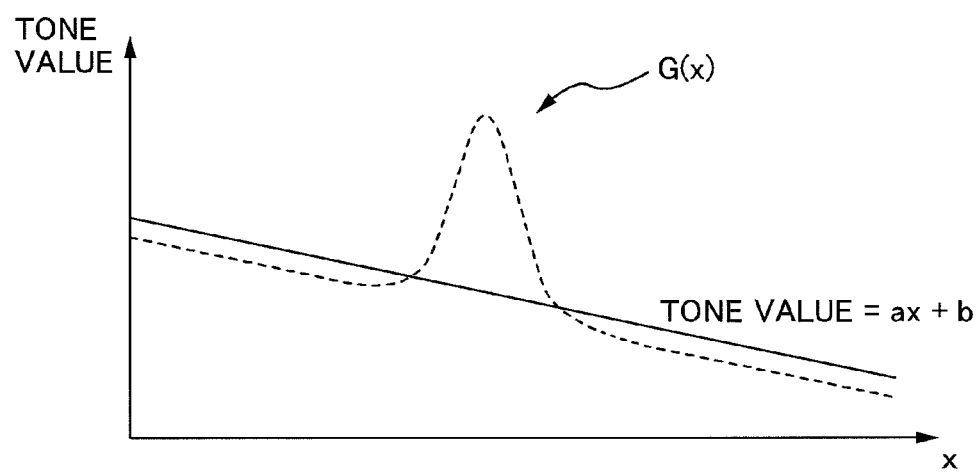
FIG. 31A is an explanatory diagram of an approximate straight line.

FIG. 31A is an explanatory diagram of the approximate straight line. The graph indicated by a dotted line in the diagram is a graph of tone values of a pixel row (a pixel row in which there is a defective pixel). The graph of the dotted line is given as G(x). The solid line in the diagram is the approximate straight line that has been calculated. This straight line can be expressed as having a slope a and an intercept b. The slope a and the intercept b are calculated by a method of least squares.

Figure 31B:
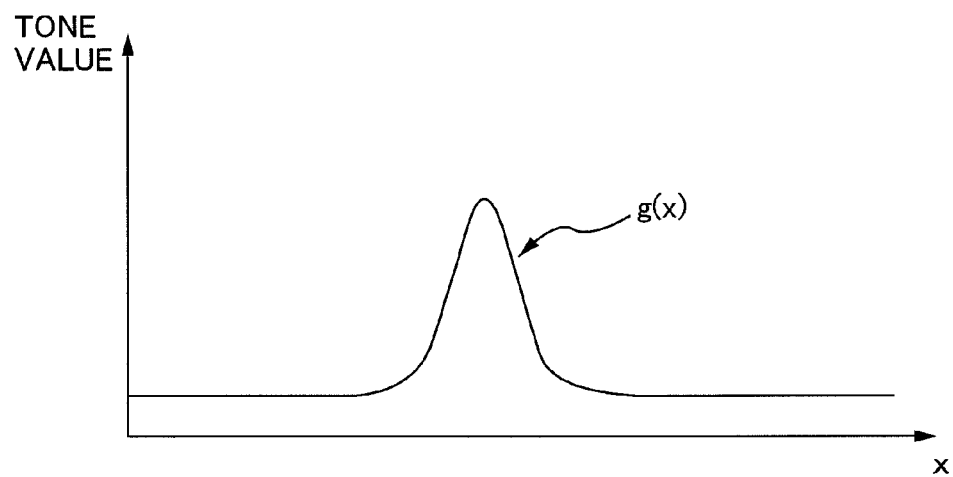
FIG. 31B is a graph of tone values after tilt correction.

Next, the computer 110 corrects the tilt of the tone values based on the approximate straight line (S203). FIG. 31B is a graph of tone values after tilt correction. When the graph of the tone values after correction is given as g(x), g(x) is calculated as $g(x)=G(x)-(ax+b)$.

Next, the computer 110 calculates an average value ave and a standard deviation $\sigma$ of the tone values g(x) after tilt correction (S204). It should be noted that when there are no defective pixels or a small number of defective pixels in the pixel row, the standard deviation $\sigma$ becomes a small value compared to when there are many defective pixels in the pixel row. Furthermore, when the pixel row is a white background area (see the lower side graph in FIG. 29) in a case where there are no defective pixels in the pixel row, the standard deviation $\sigma$ becomes an even smaller value compared to when it is an area in which a line is formed (see the upper side graph in FIG. 29).

Next, the computer 110 determines whether or not the standard deviation $\sigma$ is a predetermined value or less (S205). For this predetermined value, a number such as "3" for example may be set in advance. In a case where the tone value g(x) after tilt correction has no defective pixels or where there are few defective pixels in the pixel row as in any of the graphs of FIG. 29, the standard deviation $\sigma$ is prone to being the predetermined value or less. On the other hand, in a case where the standard deviation $\sigma$ is greater than the predetermined value (No at S205), it is conceivable that there are many defective pixels in the pixel row.

Then, when the computer 110 has determined at S205 that the standard deviation $\sigma$ is the predetermined value or less, then $3 \times \sigma$ is set as the threshold value (S206). On the other hand, when the computer 110 has determined at S205 that the standard deviation $\sigma$ is greater than the predetermined value, then $\sigma$ is set as the threshold value (S207).

Next, the computer 110 carries out detection for defective pixels (S208). The threshold value set at S206 or S207 is used in detecting defective pixels, and a range inside the threshold centering on the average value ave of the graph g(x) after tilt correction is set as the normal range, and pixels having tone values outside this normal range are detected as defective pixels.

FIGS. 32A to 32D are explanatory diagrams of the normal range.

Figure 32A:
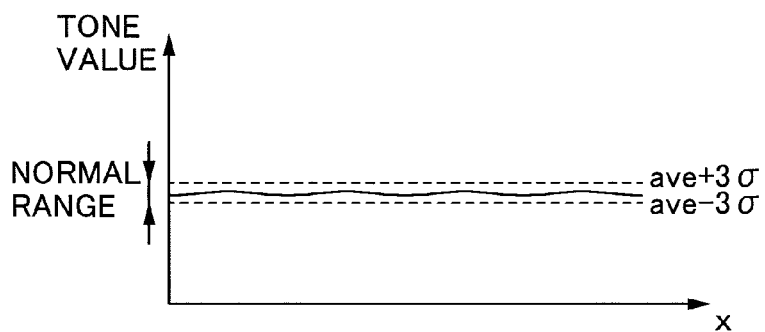
FIG. 32A to 32D are explanatory diagrams of a normal range.

FIG. 32A is an explanatory diagram of the normal range in a case where there is no defective pixel in the pixel row of a white background area. In a case where there is no defective pixel in the pixel row of a white background area, the standard deviation $\sigma$ of the pixel row becomes a comparatively small value and the range of tone values in the normal range becomes narrow. Accordingly, it is possible to detect a defective pixel even supposing that there is microscopic dirt or the like.

Figure 32B:
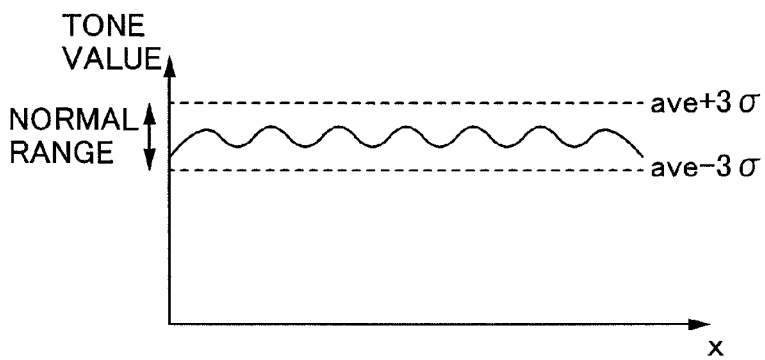

FIG. 32B is an explanatory diagram of the normal range in a case where there is no defective pixel in the pixel row of an area in which a line is formed. Compared to a pixel row of a white background area, the standard deviation $\sigma$ for a pixel row of an area in which a line is formed becomes a comparatively large value and the range of tone values in the normal range becomes wide. Accordingly, the risk of detecting a normal pixel as a defective pixel is reduced.

Figure 32C:
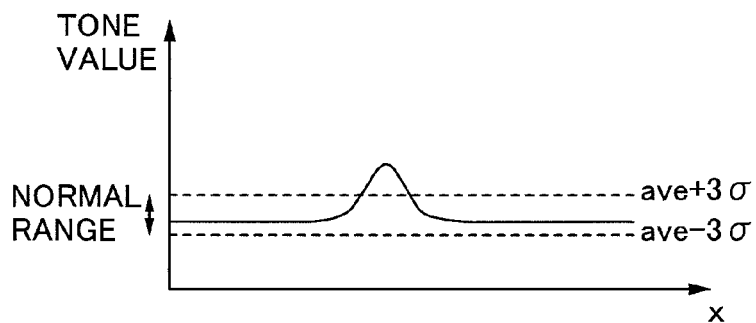

FIG. 32C is an explanatory diagram of the normal range in a case where there is a defective pixel in a pixel row. In a case where the dirt is microscopic or the number of pieces of dirt is small, the standard deviation $\sigma$ is equal to or less than the predetermined value and the threshold value is set to $3 \times \sigma$ (see S206). Then, pixels having tone values outside the threshold value range centered on the average value ave of the graph g(x) after tilt correction are detected as defective pixels.

Figure 32D:
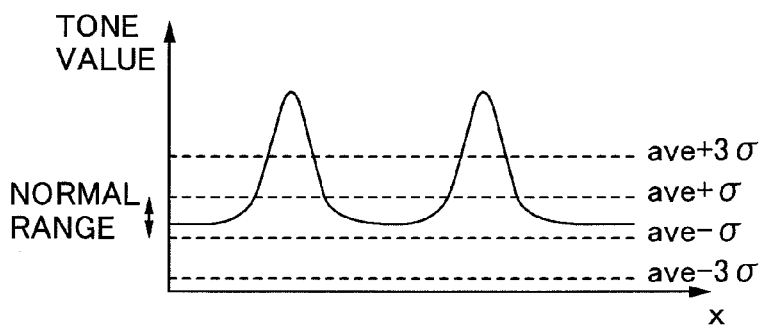

FIG. 32D is an explanatory diagram of the normal range in a case where there is a multitude of defective pixels in a pixel row. In a case where the dirt is large or the number of pieces of dirt is large, the standard deviation $\sigma$ becomes larger than the predetermined value and the threshold value is set to a value $\sigma$ that is smaller than $3 \times \sigma$ (see S207). Suppose that the threshold value is always set to $3 \times \sigma$ without providing the determination process of S205, the normal range would be set undesirably wide and pixels that should be detected as defective pixels would be determined undesirably as normal pixels.

Next, the computer 110 determines whether or not the number of defective pixels detected at S208 is equal to or less than 30% of the number of pixels in the pixel row (S209). When the percentage of defective pixels contained in the pixel row exceeds 30% (No at S209), it is conceivable that the connection between the calculated average value and the actual tone (density) of the pixel row is weak even when defective pixels are eliminated to calculate the average value of the pixel data in the pixel row. For this reason, the computer 110 reports an error and finishes without carrying out subsequent processing (S210). With this embodiment, defective pixels can be detected with excellent accuracy, and therefore error reports can be carried out accurately. It should be noted that in a case where an error has been reported, the inspector may reload the test pattern in the scanner 150 and again carry out the process of S102 (FIG. 7).

When the percentage of defective pixels contained in the pixel row is equal to or less than 30% (Yes at S209), the computer 110 eliminates the defective pixels and calculates the average value of the pixel row (S211). It should be noted that the data used in calculating the average value at this time is not the value of the graph g(x) after tilt correction but the value of the graph G(x) before tilt correction. This is because supposing that the average value was calculated based on the value of the graph g(x) after tilt correction, the value of the intercept b of the approximate straight line would be affected by defective pixels and therefore the calculated average value would also be affected by the defective pixels.

The computer 110 repetitively carries out the above-described processing on all the pixel rows (S201 to S212) and calculates average values of the pixel data of each pixel row (S213). In this way data can be obtained such as in FIG. 18B and the right side of FIG. 25.

Then, the computer 110 calculates line positions (S213) indicating image data based on the respective tone values of the pixel rows (the respective average values of the pixel rows calculated in the above-described processing). Specifically, the computer 110 obtains the pixel row whose tone value is a peak value and determines a predetermined range of a plurality of pixel rows centered on this pixel row as the calculation range. Then, based on the tone values of the pixel rows in this calculation range, a centroid position of tone values in this calculation range is calculated, and this centroid position is calculated as the line position. It should be noted that the centroid position is calculated as a value in which a "sum total of the products of the tone values of the pixel rows and the y-direction positions of the pixel rows in the calculation range" is divided by a "sum total of tone values of the pixel rows in the calculation range." With the present embodiment, the centroid position of tone values can be calculated in a state in which defective pixels are eliminated appropriately, and therefore line positions can be calculated accurately.

Other Embodiments

The foregoing embodiment described primarily a printer. However, it goes without saying that the foregoing description also includes the disclosure of printing apparatuses, recording apparatuses, liquid ejection apparatuses, transport methods, printing methods, recording methods, liquid ejection methods, printing systems, recording systems, computer systems, programs, storage media storing programs, display screens, screen display methods, and methods for producing printed material, for example.

Also, a printer, for example, serving as an embodiment was described above. However, the foregoing embodiment is for the purpose of elucidating the present invention and is not to be interpreted as limiting the present invention. The invention can of course be altered and improved without departing from the gist thereof and includes functional equivalents. In particular, embodiments described below are also included in the invention.

Regarding the Printer

In the above embodiments a printer was described, however, there is no limitation to this. For example, technology like that of the present embodiments can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices.

Furthermore, there is no limitation to the use of piezo elements and, for example, application in thermal printers or the like is also possible. Furthermore, there is no limitation to ejecting liquids and application in wire dot printers or the like is also possible.

Regarding Test Sheets

With the foregoing embodiments, a line position calculating process shown in FIG. 30 is carried out when calculating the position of each line formed on a test sheet for correcting transport amounts. However, if it is a case of calculating a position of a line of an image indicating image data, it is possible to apply the foregoing line position calculating process.

For example, it is also possible to carry out the foregoing line position calculating process on a test sheet for correcting the timing of ink ejection. With a test sheet for correcting the timing of ink ejection, a first line is formed along the transport direction by simultaneously ejecting ink from the nozzles #1 to #45 of the transport direction downstream side when the carriage 31 is moved in the forward pass, after which a second line is formed along the transport direction without transporting the test sheet by simultaneously ejecting ink from the nozzles #46 to #90 of the transport direction upstream side when the carriage 31 is moved in the reverse path. Then, by detecting the interval between the first line and the second line, the ink ejection timing of the reverse path can be corrected with respect to the forward pass. When correcting the timing of ink ejection based on reading a test sheet of this kind with a scanner and the image data thereof, it is possible to apply the line position calculating process shown in FIG. 30. However, with the foregoing embodiment, lines are formed along the movement direction and the position of each line in the transport direction is calculated, but there is a difference with a test sheet for correcting the timing of ink ejection in that lines are formed along the transport direction and the position of each line in the movement direction is calculated.

Furthermore, techniques in which a line position is calculated based on image data are not limited to calculating line positions in test sheets, but may also be applied to calculating line positions on reference sheets.

Overview (1) With the foregoing embodiment, the y-direction position of a line along the x-direction is calculated (see FIG. 25) based on image data of an image constituted by a plurality of pixels lined up in a matrix form in the x direction and the y direction. Here, when there is adherent dirt or when a dot that forms the line is missing, there is a risk that the position of the line will not be calculated accurately (see FIG. 26). Accordingly, with the foregoing embodiment, in calculating an average value of tone values of the pixel row (the plurality of pixels lined up in the x direction), a normal range is set and pixels of tone values outside the normal range are detected as defective pixels.

However, when the range of the normal range is fixed, there is a risk that pixel data of normal pixels, which are not defective pixels, will be eliminated or that the sensitivity for distinguishing defective pixels will be lowered.

Accordingly, with the foregoing embodiment, a threshold value is set in response to an extent of unevenness in the tone values and the normal range is set based on this threshold value. For example, unevenness in tone values is small in white background areas, and a normal range having a narrow range is set based on a small threshold value (see FIG. 32A). Furthermore, unevenness in tone values is large in areas in which a line is formed, and a normal range having a wide range is set based on a large threshold value (see FIG. 32B). In this way, with the foregoing embodiment, the sensitivity for distinguishing defective pixels is not reduced while also not detecting normal pixels as defective pixels.

According to the above embodiment, when calculating a position in the y-direction based on the image data, an average value (an example of a representative value indicating a tone value of a pixel row) of the pixel data of the pixels other than the defective pixel, of the plurality of pixels arranged in the x-direction, is calculated (refer to S211 in FIG. 30), and the position of the line in the y-direction is calculated based on this average value. This is because supposing that an average value of the pixel row is calculated including the defective pixel, then the position of the line will be calculated with the influence from the defective pixel. Note that, if it is considered an error when even one defective pixel is detected, the operation will not continue, therefore if there are less than 30% of defective pixels in the above embodiment, then the line position calculating process is continued.

(2) In the above embodiment, a standard deviation σ is taken as an extent of unevenness of tone values. Note that the standard deviation σ is calculated as a positive square root of a variance (a difference between a statistic and an average value is squared, and arithmetically averaged). If the range of an average value ave ±standard deviation σ is set as a normal range, it is possible that a normal pixel is not detected as a defective pixel, and that sensitivity of discriminating a defective pixel is not decreased.

However, the normal range does not necessarily have to be set based on the standard deviation σ. For example, the normal range can be set based on the variation.

(3) According to the above embodiment, if the standard deviation σ is a predetermined value or less, a value obtained by multiplying the standard deviation σ by a coefficient 3 is taken as a threshold value (refer to S206 in FIG. 30). In this way, the normal range can be set according to the standard deviation σ.

(4) Further, according to the above embodiment, if the standard deviation σ is a predetermined value or less, a value obtained by multiplying the standard deviation a by a coefficient 3 is taken as a threshold value (refer to S206 in FIG. 30), and if the standard deviation σ is larger than a predetermined value, the value that is obtained by multiplying the standard deviation a by a coefficient 1 is taken as a threshold value (see S207 in FIG. 30). In this way, if the coefficient is set so that when the standard deviation value is large then the coefficient is small, if there are multiple defective pixels in the pixel row then multiple defective pixels can be detected.

(5) Note that, in the above embodiment, the average value of the tone value of the pixel row is taken as a representative value indicating the tone value of that pixel row. However, the representative value indicating the tone value of the pixel row is not limited to an average value. For example, an intermediate value can be used instead of the average value.

(6) According to the above embodiment, an approximate line is calculated based on a tone value G(x) indicating pixel data of a pixel row (a plurality of pixels arranged in the x direction), a tone value G(s) is corrected to g(x) based on this approximate line (refer to FIG. 31A and FIG. 31B), and the defective pixel is detected based on the corrected tone value g(x). In this way, even if the line in the measurement pattern is inclined, it is possible to accurately specify the defective pixels.

(7) Providing all of the structural elements of the foregoing embodiments allows all the effects to be attained and is therefore desirable. However, it is not necessary that all the aforementioned structural elements in the above embodiments are provided. For example, supposing that the white space amount calculations of S135 (see FIG. 13) are not carried out, although the accuracy of the corrections is reduced, it is still possible to correct the DC component transport error.

(8) It should be noted that the description of the foregoing embodiments included not only description of a line position calculating method, but also included description of a method for calculating correction values. And since line positions can be calculated accurately with the above-mentioned method for calculating correction values, it is possible to accurately calculate correction values.

(9) It should be noted that the description of the foregoing embodiments included not only description of a line position calculating method, but also included description of a program installed on the computer 110. And with the above-mentioned program, the printer 1, the scanner 150, and the computer 110 can be controlled so as to enable accurate calculations of line positions.

What is claimed is:

1. A method for calculating a position, in a second direction, of a line along a first direction in an image, based on image data of the image constituted by a plurality of pixels arranged in a matrix form in the first direction and in the second direction, the method comprising:
  obtaining pixel data of each of a plurality of pixels arranged in the first direction;
  calculating an extent of unevenness of each tone value indicating the pixel data of each of the plurality of pixels arranged in the first direction;
  setting a threshold value according to the extent of unevenness;
  setting a range based on the threshold value;
  detecting a defective pixel in which the tone value indicating the pixel data is out of the range;
  calculating a representative value indicating a tone value of a pixel row, based on the pixel data of the pixels other than the defective pixel of the plurality of pixels constituting the pixel row; and
  calculating a position, in the second direction, of the line, based on the representative value of each pixel row.

2. A line position calculating method as claimed in claim 1, wherein
  the extent of unevenness is a standard deviation, and
  when setting the range, the range is set based on the each tone value indicating the pixel data of each of the plurality of pixels arranged in the first direction and the standard deviation.

3. A line position calculating method as claimed in claim 2, wherein
when setting the threshold value, the threshold value is set based on a value obtained by multiplying the standard deviation by a predetermined coefficient.

4. A line position calculating method as claimed in claim 3, wherein
the coefficient is set so that when a value of the standard deviation is large the coefficient is small.

5. A line position calculating method as claimed in claim 1, wherein
an average value of the pixel data of the pixels other than the defective pixel, of the plurality of pixels constituting the pixel row, is calculated as the representative value, and a position, in the second direction, of the line is calculated based on the average value.

6. A line position calculating method as claimed in claim 1, wherein
after obtaining the pixel data of each of the plurality of pixels arranged in the first direction, an approximate line is calculated based on each tone value indicating the pixel data of each of the plurality of pixels arranged in the first direction, and each tone value is corrected based on the approximate line, and
when detecting the defective pixel, the defective pixel is detected based on each tone value that has been corrected.

7. A correction value obtaining method comprising:
printing a measurement pattern including a plurality of lines on a test sheet by causing a printing apparatus to repetitively carry out alternately a transport operation of transporting a test sheet and a forming operation of forming the lines along a predetermined direction;
obtaining image data of an image constituted by a plurality of pixels arranged in a matrix form in a first direction and a second direction, by reading with a scanner the measurement pattern that has been printed on the test sheet;
calculating a position, in the second direction, of a line along the first direction in the image, based on the image data; and
obtaining a correction value for the transport operation based on the position,
wherein
when calculating the position, in the second direction, of the line along the first direction in the image, based on the image data,
pixel data of each of the plurality of pixels arranged in the first direction is obtained,
an extent of unevenness of tone values indicating the pixel data of each of the plurality of pixels arranged in the first direction is calculated,
a threshold value according to the extent of unevenness is set,
a range based on the threshold value is set,
a defective pixel, in which the tone value indicating the pixel data is out of the range, is detected,
a representative value indicating a tone value of a pixel row is calculated, based on pixel data of pixels other than the defective pixel of the plurality of pixels constituting the pixel row, and
a position, in the second direction, of the line is calculated, based on the representative value of each pixel row.

8. A non-transitory computer storage medium having a program stored thereon, the program comprising:
code for causing a printing apparatus to print a measurement pattern including a plurality of lines on a test sheet by causing the printing apparatus to repetitively carry out alternately a transport operation of transporting the test sheet and a forming operation of forming the lines along a predetermined direction;
code for causing a computer to output an image data of an image constituted by a plurality of pixels arranged in a matrix form in a first direction and a second direction, by causing a scanner to read the measurement pattern that has been printed on the test sheet;
code for making the computer calculate a position, in the second direction, of a line along the first direction in the image, based on the image data; and
code for making the computer obtain a correction value for the transport operation based on the position,
wherein
the program causes the computer, when causing it to calculate the position, in the second direction, of the line along the first direction in the image, based on the image data,
to obtain pixel data of each of the plurality of pixels arranged in the first direction,
to calculate an extent of unevenness of each tone value indicating the pixel data of each of the plurality of pixels arranged in the first direction,
to set a threshold value according to the extent of unevenness,
to set a range based on the threshold value,
to detect a defective pixel in which the tone value indicating the pixel data is out of the range,
to calculate a representative value indicating a tone value of a pixel row, based on the pixel data of the pixels other than the defective pixel of each of the plurality of pixels constituting the pixel row, and
to calculate a position, in the second direction, of the line, based on the representative value of each pixel row.

* * * * *